US010955345B2

(12) United States Patent
Laycock

(10) Patent No.: US 10,955,345 B2
(45) Date of Patent: Mar. 23, 2021

(54) RELATING TO REMOTE SENSING

(71) Applicant: BAE SYSTEMS plc, London (GB)

(72) Inventor: Leslie Charles Laycock, Chelmsford (GB)

(73) Assignee: BAE SYSTEMS PLC, London (GB)

(*) Notice: Subject to any disclaimer, the term of this patent is extended or adjusted under 35 U.S.C. 154(b) by 193 days.

(21) Appl. No.: 16/060,720

(22) PCT Filed: Dec. 5, 2016

(86) PCT No.: PCT/GB2016/053823
§ 371 (c)(1),
(2) Date: Jun. 8, 2018

(87) PCT Pub. No.: WO2017/098223
PCT Pub. Date: Jun. 15, 2017

(65) Prior Publication Data
US 2018/0356342 A1 Dec. 13, 2018

(30) Foreign Application Priority Data

Dec. 9, 2015 (EP) .................................... 15275257
Dec. 9, 2015 (GB) .................................... 1521695

(51) Int. Cl.
G01N 21/64 (2006.01)
G02B 26/06 (2006.01)
(Continued)

(52) U.S. Cl.
CPC ........... *G01N 21/643* (2013.01); *G01K 11/20* (2013.01); *G01L 11/02* (2013.01); *G01N 21/63* (2013.01);
(Continued)

(58) Field of Classification Search
CPC .... G01K 11/20; G01N 21/643; G01N 21/645; G01N 21/6489; G01N 2021/1793; G01N 2021/6432; G01N 2021/7786; G02B 5/128
See application file for complete search history.

(56) References Cited

U.S. PATENT DOCUMENTS 2,407,680 A 9/1946 Palmquist
2,713,286 A 7/1955 Taylor
(Continued)

FOREIGN PATENT DOCUMENTS

EP 2187239 A1 5/2010
GB 1477175 6/1977
(Continued)

OTHER PUBLICATIONS

Extended European Search Report received for EP Application No. 15275257.2 dated Jun. 24, 2016. 7 pages.
(Continued)

*Primary Examiner* — Nimeshkumar D Patel
*Assistant Examiner* — Gedeon M Kidanu
(74) *Attorney, Agent, or Firm* — Finch & Maloney PLLC

(57) ABSTRACT

A system for remotely sensing light from within a monitored environment containing one or more retro-reflective optical elements. The system includes an illuminator including a light source and a reflector unit comprising a deformable mirror arranged to receive light from the light source and to reflect the received light. This outputs illumination light from the illuminator for illuminating the optical element(s) within the monitored environment. A detector is arranged to receive light returned by the one or more retro-reflective optical elements in response to the illumination light. The detector determines a wavefront of the returned light and detects a property of the monitored environment according
(Continued)

to the returned light. The reflector unit is arranged to deform the deformable mirror according to the determined wavefront such that light from the light source is reflected by the deformable mirror so deformed to output illumination light with a modified wavefront.

22 Claims, 8 Drawing Sheets

(51) Int. Cl.
| | |
|---|---|
| G01K 11/20 | (2006.01) |
| G01S 7/48 | (2006.01) |
| G01S 7/481 | (2006.01) |
| G01S 17/74 | (2006.01) |
| G01N 21/63 | (2006.01) |
| G01S 17/95 | (2006.01) |
| G01S 7/497 | (2006.01) |
| G01L 11/02 | (2006.01) |
| G01N 21/17 | (2006.01) |
| G02B 5/126 | (2006.01) |

(52) U.S. Cl.
CPC .......... *G01N 21/6489* (2013.01); *G01S 7/481* (2013.01); *G01S 7/4802* (2013.01); *G01S 7/4811* (2013.01); *G01S 7/497* (2013.01); *G01S 17/74* (2013.01); *G01S 17/95* (2013.01); *G02B 26/06* (2013.01); *G01N 2021/1793* (2013.01); *G01N 2201/06193* (2013.01); *G02B 5/126* (2013.01); *Y02A 90/10* (2018.01)

(56) References Cited

U.S. PATENT DOCUMENTS

| | | | |
|---|---|---|---|
| 3,025,764 | A | 3/1962 | McKenzie |
| 3,700,478 | A | 10/1972 | Bingham |
| 3,919,031 | A | 11/1975 | White |
| 4,708,494 | A | 11/1987 | Kleinerman |
| 4,996,412 | A * | 2/1991 | Anafi ............ G02B 26/06 250/201.9 |
| 5,670,209 | A | 9/1997 | Wyckoff |
| 5,822,074 | A | 10/1998 | Deason et al. |
| 6,278,100 | B1 | 8/2001 | Friedman et al. |
| 7,336,351 | B1 | 2/2008 | Sweatt et al. |
| 2002/0153497 | A1 | 10/2002 | Pepper et al. |
| 2003/0016368 | A1 | 1/2003 | Aman et al. |
| 2004/0090622 | A1* | 5/2004 | Nielsen ............ G01N 21/6408 356/317 |
| 2006/0098272 | A1 | 5/2006 | Lerner et al. |
| 2006/0255292 | A1 | 11/2006 | Ja |
| 2007/0036680 | A1 | 2/2007 | Hobbs et al. |
| 2007/0127030 | A1 | 6/2007 | Shpantzer |
| 2008/0309873 | A1 | 12/2008 | Levecq et al. |
| 2009/0059371 | A1 | 3/2009 | Glembocki et al. |
| 2009/0065583 | A1* | 3/2009 | McGrew ............ G01N 21/6489 235/454 |
| 2010/0035043 | A1 | 2/2010 | Bird |
| 2011/0103410 | A1 | 5/2011 | Hutchin |
| 2011/0215229 | A1 | 9/2011 | Laycock et al. |
| 2012/0140224 | A1* | 6/2012 | Switkes ............ G01N 21/78 356/369 |
| 2013/0003056 | A1 | 1/2013 | Piorek et al. |
| 2013/0215510 | A1 | 8/2013 | Gelfant et al. |
| 2015/0279250 | A1 | 10/2015 | McDaniel et al. |
| 2017/0276844 | A1 | 9/2017 | McCoy et al. |

FOREIGN PATENT DOCUMENTS

| | | | |
|---|---|---|---|
| GB | 2162713 | A | 2/1986 |
| JP | H03273123 | A | 12/1991 |
| JP | 2015060202 | A | 3/2015 |
| JP | 2015203592 | A | 11/2015 |
| WO | 97/23423 | | 7/1997 |
| WO | 98/37406 | | 8/1998 |
| WO | 0114849 | A | 3/2001 |
| WO | 2005/022210 | A1 | 3/2005 |
| WO | 2005/041450 | A1 | 5/2005 |
| WO | 2006099317 | | 9/2006 |
| WO | 2008/139136 | A2 | 11/2008 |
| WO | 2010/055325 | A1 | 5/2010 |
| WO | 2012078324 | | 6/2012 |
| WO | 2014/143235 | A1 | 9/2014 |
| WO | 2017/098220 | A1 | 6/2017 |
| WO | 2017/098221 | A1 | 6/2017 |
| WO | 2017/098222 | A1 | 6/2017 |
| WO | 2017/098223 | A1 | 6/2017 |

OTHER PUBLICATIONS

GB Search Report under Section 17(5) received for GB Application No. 1521695.5 dated Jun. 20, 2016. 4 pages.
International Search Report and Written Opinion Received for PCT Application PCT/GB2016/053823. dated Feb. 23, 2017. 13 pages.
GB Combined Search and Examination Report under Sections 17 and 18(3) received for GB Application No. 1620632.8 dated Mar. 30, 2017. 8 pages.
Kameya, et al., "Development of a Combined PSP/TSP Sensor Using Quantum Dot," 15th International Symposium on Flow Visualization, Jun. 25-28, 2012. 5 pages.
Stich, et al., "Multiple fluorescent chemical sensing and imaging," Chemical Society Reviews, 2010, vol. 39, pp. 3102-3114.
Notice of Allowance in related U.S. Appl. No. 16/060,682 (dated Aug. 18, 2020).
International Preliminary Report on Patentability received for PCT Application PCT/GB2016/053823, dated Jun. 21, 2018. 8 pages.
International Preliminary Report on Patentability received for PCT Application PCT/GB2016/053822, dated Jun. 21, 2018. 9 pages.
International Preliminary Report on Patentability received for PCT Application PCT/GB2016/053821, dated Jun. 21, 2018. 12 pages.
International Preliminary Report on Patentability received for PCT Application PCT/GB2016/053820, dated Jun. 21, 2018. 13 pages.
Extended European Search Report received for EP Application No. 15275253.1 dated May 24, 2016. 13 pages.
GB Search Report under Section 17(5) received for GB Application No. 1521648.4 dated Jun. 14, 2016. 4 pages.
International Search Report and Written Opinion Received for PCT Application PCT/GB2016/053821, dated Feb. 21, 2017. 15 pages.
GB Combined Search and Examination Report under Sections 17 and 18(3) received for GB Application No. 1620626.0 dated Mar. 30, 2017. 8 pages.
Extended European Search Report received for GB Application No. 15275258.0 dated May 23, 2016. 7 pages.
GB Search Report under Section 17(5) received for GB Application No. 1521702.9 dated May 19, 2016. 4 pages.
International Search Report and Written Opinion Received for PCT Application PCT/GB2016/053822, dated Feb. 13, 2017. 13 pages.
Extended European Search Report received for EP Application No. 15275256.4 dated May 24, 2016. 15 pages.
GB Search Report under Section 17(5) received for GB Application No. 1521693.0 dated Sep. 22, 2016. 4 pages.
GB Combined Search and Examination Report under Sections 17 and 18(3) received for GB Application No. 1620631.0. dated Mar. 30, 2017. 9 pages.
International Search Report and Written Opinion Received for PCT Application PCT/GB2016/053820, dated Feb. 17, 2017. 19 pages.
Burmistrov, et al.,"Spherical Retroreflector with an Extremely Small Target Error: International Experiment in Space," Proceedings of 13th International Workshop on Laser Ranging. 2002. pp. 1-6.
Kucharski, et al., "Spin parameters of nanosatellite BLITS determined from Graz 2 kHz SLR data," Elsevier, Advances in Space Research, vol. 48 (2011). pp. 343-348.

* cited by examiner

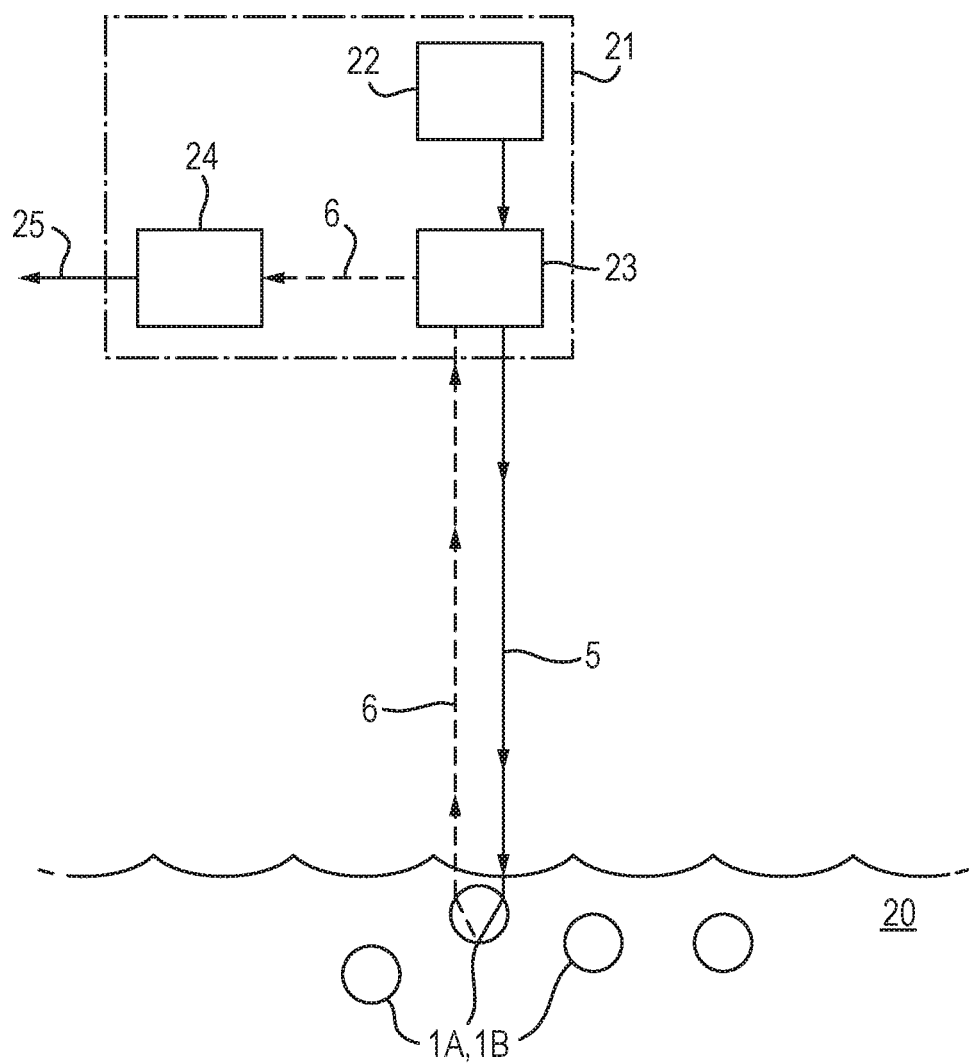

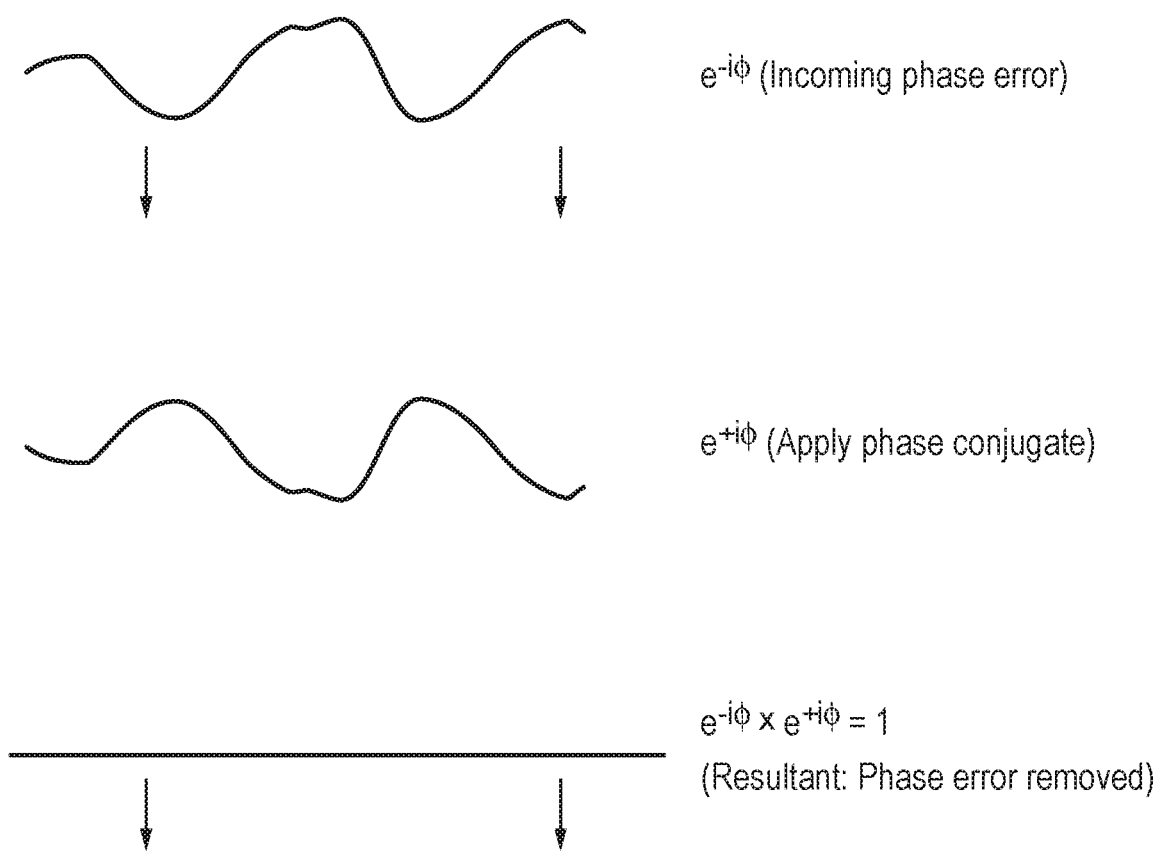

RELATING TO REMOTE SENSING

FIELD OF THE INVENTION

The invention relates to remote sensing systems and methods. In particular, though not exclusively, the invention relates to free-space optical methods of remote sensing.

BACKGROUND

Conventional free-space optical remote sensing techniques rely on irradiating a monitored environment with light intended to interact with that environment in a manner which produces a detectable change. In particular, by analysing the light that has been backscattered by target molecules within the monitored environment, such as water molecules, information about the state of those molecules may be gleaned. By inference, one may deduce the state of the environment of which those molecules form a part. For example, spectral shifts in the optical frequency of return optical signals resulting from inelastic optical interactions with a target molecule may be detected. These shifts can be either to a lower frequency (Stokes) or to a higher frequency (Anti-Stokes). By using a pulsed laser source, range data can also be simultaneously extracted.

There are two main molecular interactions of interest within such remote sensing techniques; those involving energy exchanges with phonons (density waves) known as Brillouin scattering, and those involving energy exchanges with molecular vibrational states, known as Raman scattering. Both processes have a dependence on temperature, as well as other physical parameters. The energy exchanges associated with Raman scattering are usually much larger (×1000) than those associated with Brillouin scattering, and hence the frequency shifts are concomitantly greater. This makes the Raman technique more difficult to utilise in environments where transmission windows are restricted (e.g. underwater). Consequently, Raman techniques are limited in their use.

Remote sensing techniques such as Brillouin and Raman lidar methods tend to be limited by the very low levels of molecular backscatter they produce in a monitored environment, in use. Other remote sensing techniques may be used in fields such as atmospheric research. An example is the detection of certain atmospheric pollutants, whereby a remote light source is directed to a light detector separated from the light source by a sufficiently large distance (e.g. up to a kilometre or more) containing the body of atmosphere under study. By measuring the spectrum of light received at the detector from the remote light source, and the intensity of light within specified spectral ranges, spectral absorption estimates may be made which allow identification of pollutants. However, this method depends upon to ability to place a physically steady and controllable light source in a desired location and, clearly, this may not be possible or desirable in some circumstances, especially in marine environments.

The invention aims to provide an improved technique for remote sensing.

BRIEF DESCRIPTION

At its most general, the invention provides a system and method for remote sensing. It is particularly suitable for use with retro-reflective optical elements placed in an environment to be monitored. These may be illuminated by a remote light source such that retro-reflected light returned by them may be detected for subsequent analysis as desired to monitor/detect properties of the remote environment. The invention provides a system for illuminating such optical elements in an efficient manner to enhance the strength of the optical signal returned by the optical elements and to improve the efficacy of remote sensing. For example, it has been found that improvements in returned light intensity by a factor of up to between ×5 and ×10 may be possible in some implementations. This improves signal to noise ratio, and extends the range at which remote sensing is possible, to ranges where otherwise the returned optical signal is too weak to use or even detect.

The invention desirably enhances the efficiency of retro-reflection of light incident upon remote optical elements. In preferred embodiments the invention may also enhance remote sensing capability by providing the optical element (s) which bears a photo-luminescent material having a photo-luminescent response that is dependent upon a physical property of the monitored environment. The photo-luminescent response may be variable according to changes in a physical property of the monitored environment.

In a first of its aspects, the invention provides a system for remotely sensing light emanating from within a monitored environment containing one or more retro-reflective optical elements, the system comprising an illuminator including a light source and a reflector unit comprising a deformable mirror arranged to receive light from the light source and to reflect the received light thereby to output illumination light from the illuminator for illuminating the optical element(s) within the monitored environment. A detector of the system is arranged to receive light returned by the one or more retro-reflective optical elements in response to the illumination light, to determine a wavefront of the returned light, and to detect a property of the monitored environment according to the returned light. In the system, the reflector unit is arranged to deform the deformable mirror according to the determined wavefront such that light from the light source is reflected by the deformable mirror so deformed to output illumination light with a modified wavefront. A wavefront can be taken to be a line or locus of points in a series of waves that have the same phase.

In this way, the system is able to take account of the distorting effect of the optical path traversed by returned light emanating from an illuminated optical element, as the light travels to the detector, and to estimate that distorting effect by determining the shape of the distorted wavefront of the returned light. If an optical element is sufficiently distant or sufficiently small (or both), then the light emanating from it would tend to reach the detector with substantially parallel, un-distorted wavefronts in the absence of any distorting effects along the optical path between the optical element and the detector. Thus, it is possible to reliably conclude that any wavefront distortion present within the received wavefront is the result of such distorting effects.

The inventor has realised that it is possible to use this information not simply to improve the wavefront of the returned light, which has the effect of reducing aberrations in images formed using that light, but instead to at least partially counteract the distorting effects imposed on output illumination light as it travels along the optical path between the optical element and the detector in the opposite direction—i.e. from the illuminator to the remote optical element. The inventor has been surprised to find that this has the effect of significantly improving the amount of light that is subsequently returned by the optical element (e.g. by a factor of ×5 or ×10 in some implementations). It is believed that by anticipating and at least to some extent counteracting the expected distortions that will be applied to the wavefront of outgoing illumination light, it is possible to permit the illumination light to reach a target optical element with a less distorted wavefront which the optical element is able to interact with more effectively. Put another way, the optical element may 'see' the illumination light to be more spatially stable and scintillating less. Consequently, the illumination light may be better at staying 'on target' by the time it reaches the optical element. Preferably, the reflector unit is arranged to deform the deformable mirror according to the conjugate of the shape of the determined wavefront. The shape of the reflecting surface of the deformed mirror may substantially correspond to the shape obtained if the phase of the wavefront determined by the detector, is conjugated. Thus, the reflector unit may be arranged to deform the deformable mirror according to a surface shape obtained by conjugating the phase of the shape of the determined wavefront. Put another way, the deformable mirror is preferably deformed to a surface shape arranged such that if the incoming, received wavefront (i.e. as received/determined by the detector) were to be reflected by the mirror, the reflected wavefront would be substantially plane parallel, or at least approximately so or closer to this shape than before.

The system may include one or more retro-reflective optical elements bearing a photo-luminescent material arranged such that a photo-luminescent response thereof is variable according to changes in a property of the photo-luminescent material inducible by changes in a property of the monitored environment. The detector may be arranged to receive photo-luminescent light generated by the photo-luminescent material in response to the illumination light and returned by the one or more retro-reflective optical elements in response to the illumination light. The detector may be arranged to determine the wavefront of the returned light, and to detect a property of the monitored environment according to the returned light. In this way, the received photo-luminescent light may be employed to determine the wavefront for use in mirror deformation, as well as to determine a property of the monitored environment. This may be in conjunction with, or separately from using any excitation light that may have been returned from the retro-reflective optical elements, for calculating mirror deformation. In this way, the invention may make efficient dual use of returned fluorescent signals to not only measure/detect environmental properties remotely, but also enhance the ability of the system to accurately make such measurements/detections.

The illuminator may be arranged to output the illumination light in the form of successive pulses of light. For example, the illuminator may be arranged to output light pulses at a pulse rate of between about 1 kHz and about 100 kHz, or preferably at a pulse rate of between about 1 kHz and about 50 kHz, or more preferably at a pulse rate of between about 5 kHz and about 25 kHz, such as about 10 kHz, for example. The illuminator may be arranged to change the deformation applied to the deformable mirror according to changes in the wavefront determined in respect of the light returned by the one or more retro-reflective optical elements in response to separate pulses of the illumination light. The detector is preferably arranged to determine successive said wavefronts at a rate of at least 10 times per second, or at least 50 times per second or at least about 100 times per second. The reflector unit is preferably arranged to deform the deformable mirror at a corresponding rate according to the successive wavefronts determined by the detector. The reflector unit may be arranged to change a deformation (e.g. update the deformed mirror shape) at a rate not exceeding about once every successive 50 light pulses output from the illuminator, or about once every successive 75 light pulses output from the illuminator, or more preferably about once every successive 100 light pulses output from the illuminator. It has been found that higher mirror update rates are optimal when monitoring atmospheric environments, and lower mirror update rates are optimal when monitoring water/marine environments where the deforming optical path between the illuminator and the optical elements is very different.

The deformable mirror may be arranged to receive the returned light from optical elements, and the detector may be arranged to received the returned light as reflected from the deformable mirror. In this way, the deformable mirror may be arranged to apply a pre-deformation to the un-deformed wavefront of outgoing illumination light generated by the light source, and also to substantially (or at least partially) un-deform the deformed wavefront of returned light. The same mirror deformation may be applied to both the outgoing light pulse and the light returned by an optical element in response to that outgoing pulse. Of course, the optical path between the two changes over time, and preferably so too does the deformation applied (i.e. updated) to the deformable mirror in order to account for that.

The deformable mirror may comprise a reflecting area the surface shape of which is deformable by a plurality of actuators coupled thereto. The stroke of an actuator is preferably greater than about 1 µm, or may be between about 1 µm and about 20 µm, or more preferably between about 5 µm and about 15 µm, such as about 10 µm. The term 'stroke' may be taken to mean the difference between the maximum and minimum actuator displacement.

Preferably the resonant frequency of the deformable mirror (e.g. the lowest resonance frequency if there are several) is preferably greater than about 1 kHz. A resonant frequency is close to (depending on damping) the natural frequency at which an object vibrates. When the deformable mirror is driven at a resonant frequency, the amplitude of the oscillations of the mirror rapidly increase and energy is easily transferred to the mirror from the actuators. In adaptive optics, a deformable mirror has a specific resonant frequency or set of resonant frequencies. Preferably, in preferred embodiments of the invention, the product (S×F) of the value (S) of the stroke of an actuator and the value of the lowest resonance frequency (F) of the deformable mirror is preferably a value of at least about $2 \times 10^{-2}$ HertzMetres, more preferably, least about $4 \times 10^{-2}$ HertzMetres, yet more preferably least about $5 \times 10^{-2}$ HertzMetres. For example, the lowest resonance frequency of the mirror may be between about 5 kHz and about 15 kHz, and the actuator stroke may be between about 5 µm and about 15 µm. As an illustration of this, the lowest resonance frequency (F) may be about 8 kHz and the actuator stroke (S) may be about 8 µm, such that $S \times F = 6.4 \times 10^{-2}$ HertzMetres. It has been found that this product of parameters (S×F) is an effective 'figure of merit' for the deformable mirror and constraining the value of the figure of merit in the manner described above has been found to provide optimal performance in terms of responsiveness and efficacy.

The deformable mirror preferably comprises a substantially continuous reflecting area. In other embodiments a segmented mirror is also possible. When an incoming wavefront is curved, parts of the wavefront will arrive at the detector sooner than other parts of the wavefront. If the incoming wavefront is then focussed using appropriate focussing optics, this variation in phase results in a variation in focus across the focal plane. One portion of the wavefront may come into focus in front of the focal plane while another portion of the same wavefront reaches a focus behind the focal plane. The detector preferably measures this variation of focus across such a focal plane. The deformable mirror may then be controlled according to this aberration.

The detector may comprise a wavefront sensor. A wavefront can be taken to be a line or locus of points in a series of waves that have the same phase. The wavefront sensor may be arranged to measure aberrations in optical wavefronts. The wavefront sensor may be arranged to measure an incoming wavefront in different areas of the pupil plane thereof. The wavefront sensor may comprise a lenslet array arranged to break-up/segment the pupil plane into sections. Each lenslet may be arranged to focus a part of the pupil plane onto a photo-sensor array (e.g. CCD sensor array), threat to form a corresponding array of a plurality of respective images. The lenslets of the array of lenslets may all have the same focal length. The detector may be arranged to compare the light focussed by different lenslets of the lenslet array to determine characteristics of the incoming wavefronts across the pupil plane. For example, the detector may be arranged to compare the pixel coordinate positions, upon the photo-sensor array, of the respective images formed by the lenslet array, and to determine a wavefront therefrom. This determining may be according to adaptive optics techniques readily available to the skilled person.

For example, the wavefront sensor may be a Shack-Hartmann wavefront sensor. A Shack-Hartmann wavefront sensor is a type of adaptive optics system readily available to the skilled person. It uses an array of lenslets, all of which have the same focal length, which are focused on a detector, typically a CCD. The lenslets are able to reveal the phase aberration across the image and approximate this aberration with a set of equivalent lens tilts. The wavefront can then be approximated.

Preferably, in the system according to preferred embodiments of the invention, the deformable mirror is also a tiltable mirror arranged to adjustably tilt, point or face in a desired direction in response to a tracking signal for adjusting the direction of the illumination light to maintain illumination of an optical element. This is advantageous if the monitored environment is changeable to change the position of an illuminated optical element relative to the illuminator, and/or if the illuminator is located upon a moving platform (e.g. airborne). The detector may further comprise a tracker unit arranged to generate a tracking signal according to changes in the position of an image formed from the returned light received at the detector, preferably after the wavefront of the returned light has been phase conjugated as described above (e.g. by the deformable mirror, if reflected therefrom to the detector). Thus, if there is no relative movement between the illuminated optical element(s) and the illuminator/detector system, then one would expect there to be no overall/global movement of an image of the optical element(s) formed using the returned light (e.g. the pixel coordinate position on a photo-sensor array upon which the image is focussed). However, any significant such relative motion should result in a global movement of the focussed image. The detector may be arranged to detect such image movement and generate a tracking signal according to change the orientation of the deformable mirror in such a way as to at least partially reverse the detected image movement thereby to re-aim the illumination light upon the optical element(s) as appropriate.

For example, the wavefront sensor may comprise a lenslet array arranged to break-up/segment the pupil plane into sections. Each lenslet may have same focal length and be arranged to focus a part of the pupil plane onto a photo-sensor array (e.g. CCD sensor array), threat to form a corresponding array of a plurality of respective images. The detector may be arranged to detect/monitor the position, upon the photo-sensor array, of light focussed by each of the respective lenslets and to determine a collective average value or centroid position representative of the global image comprised of the respective images formed by the lenslets. The detector may be arranged to detect a change of position of the collective average value/centroid of the global image. If a change is detected (or a change exceeding a suitable threshold value) then this may be interpreted as a global change indicating a relative movement between the illuminator/detector system and the illuminated optical element(s).

The system may include one or more of the retro-reflective optical elements. These may bear an optical coating upon a surface thereof which is optically reflective to the illumination light. The one or more retro-reflective optical elements may bear a photo-luminescent material. The detector may be arranged to receive from the optical element(s) photo-luminescent light generated by the photo-luminescent material in response to the illumination light. The photo-luminescent material may be arranged such that the photo-luminescent response is variable according to changes in a property of the photo-luminescent material inducible by changes in a property of the monitored environment. The photo-luminescent material may be exposed and directly accessible by the monitored environment. The photo-luminescent material may be responsive to the illumination light to generate photo-luminescent light comprising light of an optical wavelength differing from the optical wavelength(s) of light comprising the illumination light. Thus, desirably, the invention in some embodiments may provide a retro-reflective optical element(s) bearing a photo-luminescent material, and may provide a source of excitation light for irradiating the photo-luminescent material remotely when the optical element is placed within a monitored environment. The retro-reflective action of the optical element permits efficient return of photo-luminescent light generated by the photo-luminescent material in response to the excitation light. The photo-luminescent response of the photo-luminescent material is preferably variable according to changes in a property of the photo-luminescent material inducible by changes in the monitored property of the monitored environment.

For example, a changeable property of the photo-luminescent material may be the spectral wavelength of light at which a peak in photo-luminescent light emission intensity occurs. The photo-luminescent material may comprise a Quantum Dot (QD) material. The monitored property may be the temperature of the monitored environment. Another example is the relative emission intensity of the photo-luminescent material relative to a reference photo-luminescent intensity (e.g. of the same or different material). The photo-luminescent material may comprise a platinum meso-tetra(pentafluorophenyl)porphine (PtTFPP). The monitored property may be temperature and/or pressure. The monitored property may be salinity (e.g. of water) and the photo-luminescent material may comprise a luminophore having a photo-luminescence which is quenchable in response to the presence of salinity (e.g. $Cl^-$ ions). Examples include: Lucigenin; or, 6-methoxy-N-(3-sulfopropyl)quinolinium; or, N-(ethoxycarbonylmethyl)-6-methoxyquinolinium bromide; or, 6-methoxy-N-ethylquinolinium iodide.

In this way, a photo-luminescent property of the photo-luminescent material may be responsive to a physical property (e.g. temperature, pressure, salinity etc.) of the monitored environment as a result of interaction with it. Remote excitation of the photo-luminescent material, by a light source, enables the photo-luminescent property to be detected via photo-luminescent light returned with the aid of the retro-reflective action of the optical element(s). Therefrom, the physical property of the monitored environment may be measured.

Preferably, the photo-luminescent material is arranged such that the photo-luminescent response is variable according to changes in a property of the photo-luminescent material (e.g. its temperature, the pressure it experiences, and/or degree of photo-luminescence quenching) inducible by changes in the property of the monitored environment.

The photo-luminescent material may be exposed and directly accessible by the environment. This may be desirable when the property of the environment (e.g. water) being monitored is its salinity, thereby allowing direct contact between the photo-luminescent material and the water. Other environmental properties may be monitored by such direct contact, such as pressure, temperature or other properties.

The photo-luminescent material may be coated by an anti-reflective optical coating. This may be desirable if the photo-luminescent material is not required to directly contact the monitored environment (e.g. pressure or temperature monitoring) such that the anti-reflective optical coating does not impede that monitoring.

The optical element(s) may bear two different photo-luminescent materials: a first material responsive to changes in a specified physical property in the monitored environment, as discussed above; and a second material which may be insensitive to such changes and may thereby serve as a source of reference photo-luminescent light with which to calibrate the photo-luminescent light detected from the first material. Alternatively, or in addition, the optical element(s) may bear a second (or further) photo-luminescent material which is responsive to changes in a specified physical property of the monitored environment different to that which the first material is responsive to, and may preferably be insensitive to the specified physical property of the monitored environment to which the first material is responsive. This allows two or more different properties to be measured contemporaneously and independently.

An aforesaid optional second photo-luminescent material, when serving as a source of reference photo-luminescent light, may comprise a photo-luminescent dye (or other known photo-luminescent material with the required insensitivity) such as would be readily available to the skilled person. Preferably, when multiple photo-luminescent materials are present on an optical element, each is arranged to emit photo-luminescent light at a distinct wavelength differing from that at which the other photo-luminescent material(s) present will emit.

The detector may be arranged to determine a value of the optical wavelength at which a peak in the photo-luminescent response occurs, to calculate a value representing a temperature of the monitored environment according to the optical wavelength value, and to output the result.

Alternatively, or additionally, the detector may be arranged to determine a value of the intensity (e.g. a relative intensity) of the photo-luminescent response, to calculate a value representing a temperature and/or a pressure of the monitored environment according to the intensity value, and to output the result.

Alternatively, or additionally, the detector may arranged to determine a value of the intensity (e.g. a relative intensity) of the photo-luminescent response, to calculate a value representing a salinity of the monitored environment according to the intensity value, and to output the result.

The detector may be arranged to determine a value of the intensity of photo-luminescent light from a said reference photo-luminescent material, and to calibrate an intensity value associated with a contemporaneously-received photo-luminescent signal from a photo-luminescent material (sensing layer) accordingly. Such calibration may be by dividing the latter by the former. The detector may be arranged to determine the value of a relative intensity of photo-luminescent light from the photo-luminescent material, this being relative to the photo-luminescence intensity of a reference luminophore.

The detector may be arranged to implement a technique of Dual Luminophore Referencing (DLR) accordingly in which such relative intensity is directly measured without the need to separately measure the photo-luminescent responses for the reference material. If a technique of DLR is employed, then reference photo-luminescent material preferably has a luminescence decay time ($\tau_{ref}$) which is greater than the luminescence decay time ($\tau_{ind}$) of the environment-sensing 'indicator' photo-luminescent material by a factor of at least 100, or more preferably by a factor of at least 250, yet more preferably by a factor of at least 500, or even more preferably by a factor of at least 1000.

The reference photo-luminescent material, and the indicator photo-luminescent material may be excitable by excitation light of the same wavelength. This permits one light source to excite both. The materials may be selected to photo-luminescent by emitting wavelengths of light that overlap, or that differ, as desired. In the latter case, this allows the photo-luminescent emission signals of each to be separately identified. The reference photo-luminescent material may have a decay time having a value of between 1 μs and 100 μs. The ($\tau_{ref}$) indicator photo-luminescent material may have a decay time ($\tau_{ind}$) having a value of between 1 ns and 100 ns. Preferably, the photo-luminescent emission of the reference photo-luminescent material is substantially (practically) constant during a period of time corresponding to the decay time of the indicator photo-luminescent material. The light source may be arranged to output and excitation light having an intensity modulated to vary periodically with a modulation period (T=2π/ω) that exceeds the decay time of the indicator photo-luminescent material by a factor of at least 100, or more preferably of at least 1000, yet more preferably of at least 10,000 (e.g. $\omega\tau_{ind}$<0.01, or 0.001, or 0.0001). The frequency (ω=2π/T) of the modulation is preferably a value between 1 kHz and 100 kHz, such as between 25 kHz and 75 kHz, e.g. about 40 kHz to 50 kHz, or a value therebetween such as 45 kHz.

This use of a relative intensity value allows account to be taken of changes in the value of the intensity of the photo-luminescent response of the sensing layer which are not due to physical changes in the monitored environment but are instead due to changes in other factors, such as the distance (from the detector) to the optical element and/or changes in optical attenuation of light passing between the detector and the optical element (e.g. absorption, scattering of light etc.).

In this way, a received photo-luminescent response may be calibrated or normalised to provide a 'relative' intensity value—i.e. relative to the photo-luminescent intensity of the reference photo-luminescent material upon the same optical element.

Alternatively, or additionally, the detector may be arranged to determine a value of the intensity of the purely retro-reflected light from the light beam with which the optical element was initially illuminated, by the light source. The detector may be arranged to calibrate the value of the intensity of photo-luminescent light according to the value of the intensity of the retro-reflected light from the light beam. This may be done by dividing the former value by the later value to produce a 'relative' photo-luminescent intensity value.

In a second aspect, the invention may provide a method for remotely sensing light emanating from within a monitored environment containing one or more retro-reflective optical elements, the method comprising generating light from a light source and reflecting light from a light source at a deformable mirror thereby to output illumination light for illuminating the optical element(s) within the monitored environment. The method includes receiving light returned by the one or more retro-reflective optical elements in response to the illumination light, determining a wavefront of the returned light, and detecting a property of the monitored environment according to the returned light. The method includes deforming the deformable mirror according to a the determined wavefront such that light from the light source is reflected by the deformable mirror so deformed to output illumination light with a modified wavefront. The method may include providing one or more retro-reflective optical elements bearing a photo-luminescent material arranged such that a photo-luminescent response thereof is variable according to changes in a property of the photo-luminescent material inducible by changes in a property of the monitored environment. The method may include receiving photo-luminescent light generated by the photo-luminescent material in response to the illumination light and returned by the one or more retro-reflective optical elements in response to the illumination light. The method may include determining the wavefront of the returned light and detect a property of the monitored environment according to the returned light. In this way, the received photo-luminescent light may be employed to determine the wavefront for use in mirror deformation, as well as to determine a property of the monitored environment. This may be in conjunction with, or separately from using any excitation light that may have been returned from the retro-reflective optical elements, for calculating mirror deformation.

The method preferably includes deforming the deformable mirror according to the conjugate of the shape of the determined waveform.

The method preferably includes outputting the illumination light in the form of successive pulses of light and changing the deformation applied to the deformable mirror according to changes in the wavefront determined in respect of the light returned by the one or more retro-reflective optical elements in response to separate said pulses of the illumination light.

The method preferably includes determining successive said wavefronts at a rate of at least 10 times per second and deforming the deformable mirror at a corresponding rate according to the successive wavefronts determined by the detector.

The deformable mirror may comprise a reflecting area the surface shape of which is deformable by a plurality of actuators coupled thereto. The method preferably includes driving the actuators with a stroke greater than about 1 µm.

The optical element(s) may bear a photo-luminescent material over a surface of the reflector part and/or the focuser part. The method preferably includes receiving from the optical element(s) photo-luminescent light generated by the photo-luminescent material in response to the illumination light, wherein the photo-luminescent material is arranged such that the photo-luminescent response is variable according to changes in a property of the photo-luminescent material inducible by changes in the property of the monitored environment.

There now follow some examples of the many and various embodiments of the invention. These describe embodiments which are useful for a better understanding of the invention, but which are not intended to be limiting.

BRIEF DESCRIPTION OF THE DRAWINGS

FIG. 1 schematically shows a system according to an embodiment of the invention, comprising a light source of illumination light, a detector and retro-reflective glass (or plastic) beads according to FIG. 2A or 2B;

FIG. 5 schematically shows the process of phase conjugation of a wavefront to remove distortions therein;

DETAILED DESCRIPTION

Figure 2A:
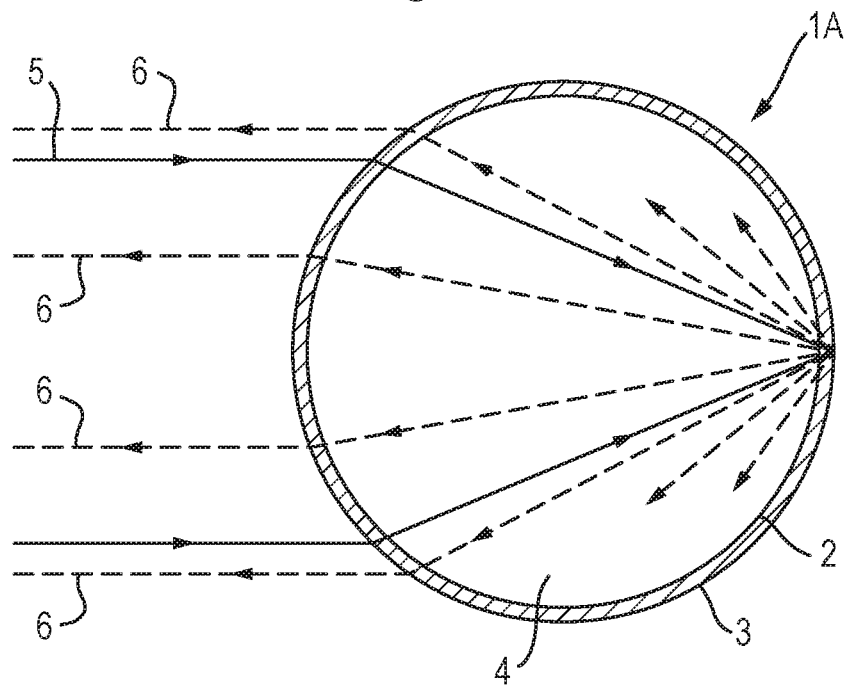
FIGS. 2A and 2B schematically show a retro-reflective glass (or plastic) beads according to embodiments of the invention.

In the drawings, like items are assigned like reference symbols.

FIG. 1 schematically illustrates a system for remotely sensing light 6 emanating from within a monitored environment 20 (e.g. the open sea in this case). The system includes a plurality of retro-reflective optical elements (See FIGS. 2A and 2B: items 1A, 1B) comprising photo-luminescent coated glass beads structured in accordance with a bead as described below with reference to either one of FIGS. 2A and 2B. The optical elements are positioned within the monitored environment 20 and float at or beneath the water surface of that environment. Typically, about one bead per cubic metre of volume observed (e.g. ocean water, or the atmosphere in other applications) is suitable, or one bead per metre of height/depth of the space being observed.

Figure 2B:
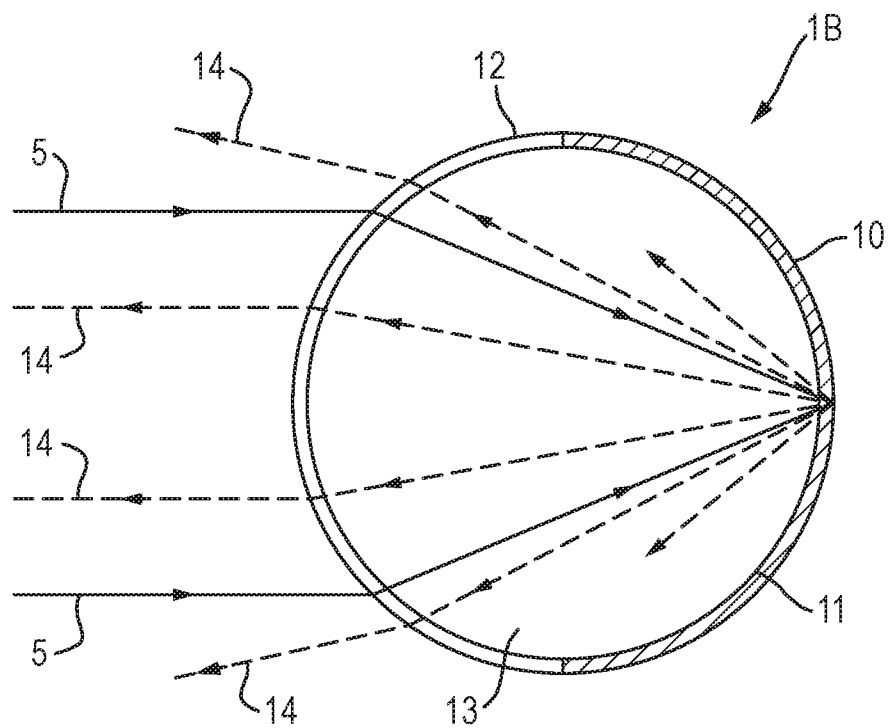

A monitoring unit 21 is located above the water surface of the monitored environment and comprises a laser light source 22 arranged to output a beam of light of wavelength corresponding to the excitation wavelength (e.g. blue/green light) of photo-luminescent material (2, 11; FIG. 2A, FIG. 2B) that coats the optical elements (1A, 1B).

A front-end optics unit 23 is positioned to receive the light beam output by the laser light source and to pre-form the light beam so as to possess an angular divergence in the range of about one degree to a few degrees to ensure that it forms a sufficiently large a "footprint" at the optical elements thereby ensuring sufficient illumination to generate a detectable returned fluorescence signal 6 from the optical elements. Furthermore, the front-end optics unit includes elements (e.g. one or more mirrors or lenses, or both) arranged to collect returned fluorescent light 6 emanating from the fluorescing, remote optical elements (1A, 1B), and to direct that collected light 6 to a detector unit 24 for analysis. The front-end optics may be 'bi-static' and so comprise separate transmission (output) and reception (input) optical elements for handling the excitation and photo-luminescent light signals, respectively. Optical filter(s) may be used at the reception optical elements to remove light of wavelengths corresponding to excitation light, and to transmit/pass wavelengths corresponding to photo-luminescent light. In this way, the reception optical elements may be made sensitive to the photo-luminescent light which carries information, and be insensitive to excitation light which does not. This improves the sensitivity of the system.

The photo-luminescent light/response produced by the photo-luminescent sensing layer (2, 11) is variable according to changes in a property (e.g. an optical property) of the photo-luminescent layer caused by changes in the temperature, pressure and/or salinity of the monitored ocean environment. As described below in detail, changes in a property of the photo-luminescent layer include changes in the spectral position of, or the magnitude/size of, or a spectral width of, a photo-luminescent/fluorescence intensity or a produced by the photo-luminescent layer in response to the excitation light of the light beam 5. Accordingly, the photo-luminescent layer serves as a "sensing layer".

Sensing Layer

Figure 6A:
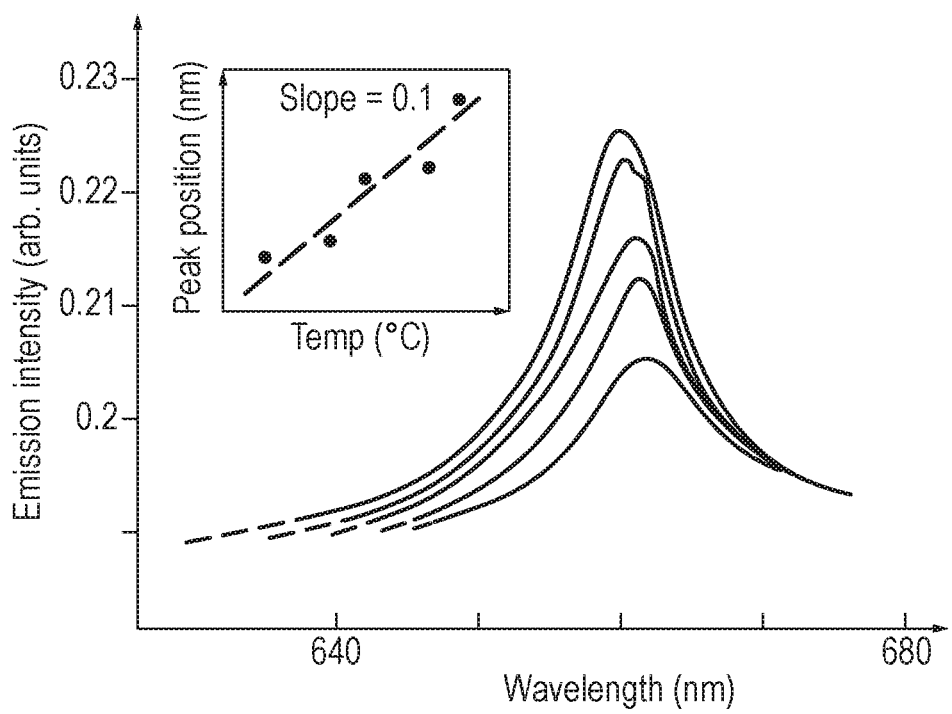
FIG. 6A graphically shows the typical spectral fluorescent response of a Quantum Dot (QD) to changes in temperature.

There exist a number of materials whose spectroscopic properties change when exposed to exterior physical parameters such as temperature and pressure. Fluorophores based on quantum dots (QDs) are synthetic materials that can be tailored to fluoresce at different desired wavelengths by changing their physical size. Smaller QDs emit photo-luminescent light of shorter wavelengths as compared to larger QDs. The optical transmission window in the blue/green region of water, such as oceans, is well matched to their absorption band. The peak fluorescence wavelength of QDs is dependent upon the temperature of the QD. This is a result of temperature-dependant changes in the size of the QD and, hence, its band-gap energy. FIG. 6A shows graphically the spectral emission intensity of a QD as a function of increasing temperature. The photo-luminescence (fluorescence in this case) signal of the QD at a given temperature is seen to peak sharply and distinctly at a specific optical wavelength of light. As the temperature of the QD increases then so too does the optical wavelength at which this peak in luminescence occurs. A steady and reliable linear relationship exists between the spectral peak position and QD temperature as shown by the inset in the graph of FIG. 6A. It can be seen from FIG. 6A that a wavelength shift of ~0.1 nm/° C. is typically observed. There is also a large temperature dependency on the emission line-width of 0.24 nm/° C. Such changes, i.e. either spectral peak position and/or spectral line-width, may be measured using a spectrometer according to preferred embodiments of the invention (see FIG. 7) in order to determine the temperature of a sensing layer (2, 11) comprising QDs.

Figure 6B:
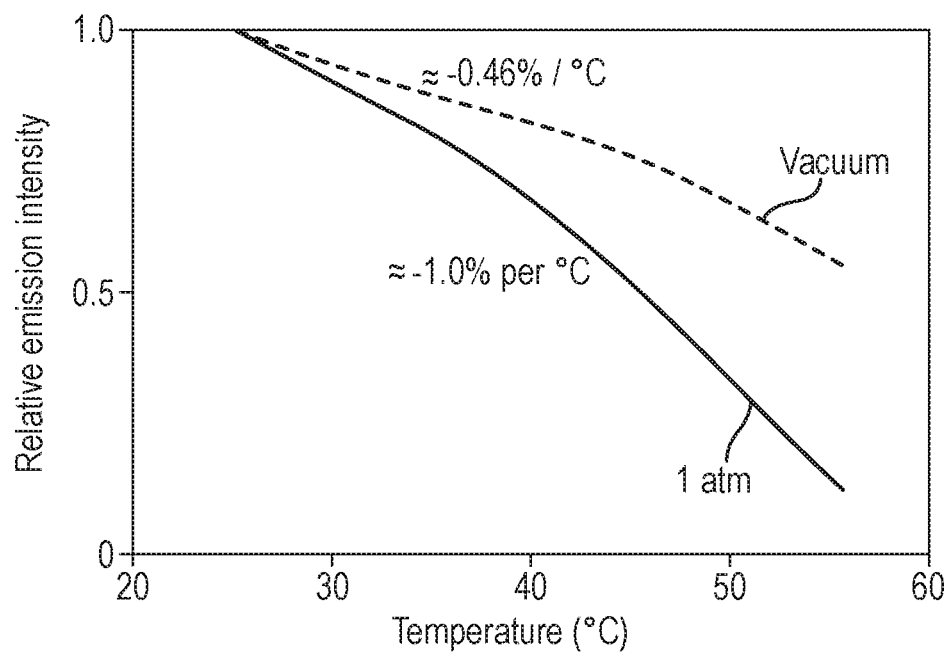
FIG. 6B graphically shows the typical fluorescent response of a PtTFPP to changes in temperature and pressure.

The fluorescent intensity output of another group of fluorphores is found to be dependent on both temperature and pressure. An example is platinum (II) mesotetra (pentafluorolphenyl) porphine or PtTFPP. FIG. 6B graphically illustrates one example of the variation in the fluorescent emission intensity of material as a function of changes in both temperature and pressure. It can be seen that at low pressure (e.g. vacuum) the material displays an emission intensity that falls in direct proportion to its temperature, whereas at a higher pressure (e.g. 1 atm), the rate of fall of the emission intensity increases. This sensitivity to both pressure and temperature may be used to remotely sense such properties according to embodiments of the invention. This material may be employed in preferred embodiments of the invention. The intensity sensitivity of PtTFPP to pressure variations may be ~0.8%/KPa at and around atmospheric pressure, and may about 1%/° C. in relation to temperature variations at and around atmospheric pressures.

Figure 6C:
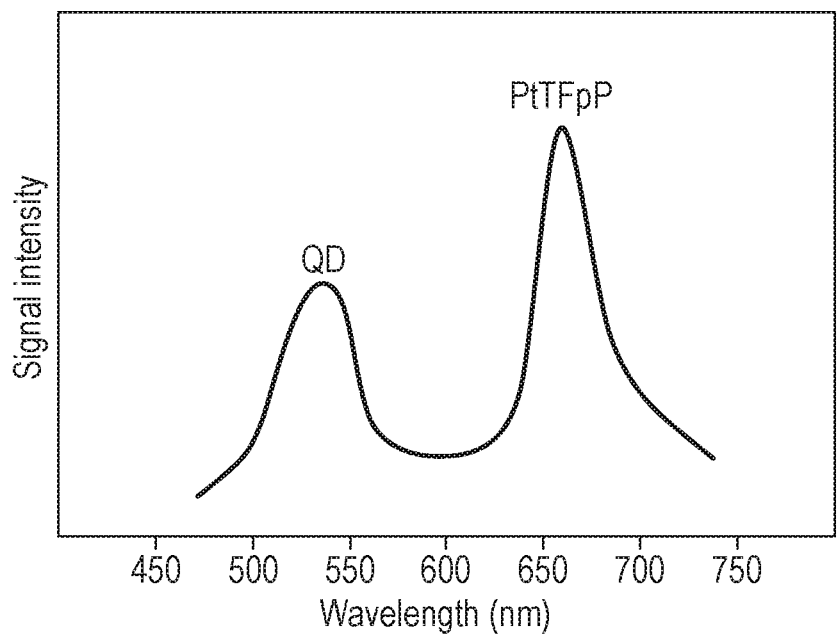
FIG. 6C graphically shows the typical fluorescent response of a sensing layer comprising a combination of quantum dots (QD) and PtTFPP.

It is found that QD sensors such as the above are generally insensitive to pressure, however a combined pressure and temperature sensor comprising a sensing layer (2, 11) containing a mixture of PtTFPP and QDs may be employed in preferred embodiments of the invention. These fluorophores emit at different wavelengths and so when illuminated by the same laser can be differentiated and measured, see FIG. 6C.

In a further example, the sensing layer may comprise a chlorine-quenchable fluorescent probe such as Lucigenin. It has been found that changes in the fluorescence intensity of this fluorophore occur in proportion to changes in salinity of a fluid (e.g. salt water or brackish water) within which the fluorophore is placed. Salt water, such as sea water or the like, is a concentrated solution of various salts. Salinity is usually determined by measuring the chlorine content of the water since this is an abundant constituent, as a result of the presence of salt (NaCl). Empirical relationships have been found between the salinity of water and its chlorine content, or "chlorinity". Such empirical relationships typically take the form:

$$S[\%] = a_1 + a_2 Cl^-[\%]$$

where $a_1$ and $a_2$ are constants, $S[\%]$ is salinity and $Cl^-[\%]$ is the chlorinity, both expressed as a percentage. Salinity in open seas usually ranges in value from 3.3% to 3.7%, whereas in extreme cases (isolated waters) salinity may reach about 4% or fall as low as 0.5%.

Consequently, it has been found that the chlorinity of salt water resulting from its salinity, has a quenching effect on the fluorescence intensity of Lucigenin. Thus, the salinity of water may be measured according to this quenching effect.

The detector unit is arranged to detect one or more of the temperature, the pressure or the salinity of the monitored ocean environment 20 according to the properties of the returned photo-luminescent light 6 received by it.

The sensing layer may comprise a Quantum Dot (QD) material and the detector unit 24 may comprise a set of optical filters, such as narrow-band filters, which each has a respective pass band located or centred at an optical wavelength different from that of the other optical filters of the set such that the collective pass-band locations of the filter set span the spectral location of a photo-luminescence peak of the QD photo-luminescent material upon the optical beads (1A, 1B) being illuminated. The detector unit may be arranged to pass received light through the optical filters and to compare the relative intensities of the respective optically filtered signals. From this comparison, the detector unit may be arranged to determine the spectral location of the photo-luminescence peak of the received light by a process of interpolation or extrapolation, using techniques such as will be readily apparent to the skilled person. As an alternative to an optical filter set, the detector unit may comprise a spectrometer (e.g. employing an optical grating) arranged to disperse received light into an optical spectrum, combined with a photo-detector array (e.g. CCD or CMOS) arranged to measure the intensity of the spectrum across a range of wavelength spanning the spectral location of the photo-luminescence peak of the received light. The detector unit may be arranged to determine the spectral location of the photo-luminescence peak within such a spectrum by a process of interpolation or extrapolation, as described above. Once a spectral peak location/position has been determined for received photo-luminescence light, the detector unit may be arranged to determine the temperature of the optical beads (1A, 1B) from which the light was emitted and, by inference, the temperature of the environment (ocean, atmosphere etc.) within which the beads reside. This may be done by applying the spectral peak position into a formula embodying the temperature dependence of the spectral peak position (see FIG. 6A; inset graph), which may be stored within a memory store of the detector unit, and therewith calculating a temperature value. The detector unit may comprise a computer (not shown) comprising a memory storage unit and a processor unit arranged to store the formula, perform the calculation, and output the result. A particular strength of this spectral method is that it does not rely on absolute optical intensities of received light signals—relative spectral intensities are sufficient.

The sensing layer may comprise a PtTFPP material and the detector unit 24 may be arranged to calculate both a temperature and a pressure of the environment (ocean, atmosphere etc.) within which the beads reside. The detector unit may be arranged to calculate a relative photo-luminescence value from the received photo-luminescence signal from the beads. This may be done by comparing a received signal to a reference value of photo-luminescence signal stored in the memory store of the detector unit. The reference value may be a calibration value previously measured in respect of a bead when located at a predetermined calibration distance. A received intensity of photo-luminescent signal may first be scaled to an equivalent value corresponding to that which would be detected were the photo-luminescent bead located at a distance equal to the calibration distance. This may be achieved with knowledge of (e.g. pre-determined, or contemporaneously measuring) the distance from the detector unit to the bead, and knowledge of the calibration distance, by using the well-known inverse-square law for variation of light intensity according to distance as would be readily apparent to the skilled person. The scaled/equivalent value of the received photo-luminescent signal may then be compared to a plurality of reference values of photo-luminescence signal stored in the memory store of the detector unit. Each reference value corresponds to a pre-measured value of photo-luminescence observed in the beads under a respective one of a plurality of different pressures and temperatures.

Examples of a continuum of such reference values is schematically shown in FIG. 6B for two example temperatures (vacuum pressure, and 1 atmosphere pressure) and a wide range of temperatures. Other such reference values (not shown) may be stored in respect of other pressures and temperatures as desired. The reference values and their associated pressures/temperatures may be stored in a look-up table for example. A pressure and temperature combination associated with the reference photo-luminescence value substantially matching (or most closely matching) the received (scaled) photo-luminescence signal may be assumed to be the pressure and temperature of the environment containing the beads (1A, 1B), and the detector unit may output a pressure/temperature measurement accordingly. Interpolation between, or extrapolation from, reference photo-luminescence values (and their associated pressure/temperature values) may be done if a received (scaled) photo-luminescence signal falls between (or beyond) reference values.

The sensing layer may comprise multiple sensing luminophores upon the same optical element, such as a Quantum Dot luminophore and a PtTFPP luminophore. These may have separate emission wavelengths, such as that shown in FIG. 6C for a combined QD/PtTFPP sensor, and permit the monitoring of both temperature and pressure accordingly, as described above.

If the sensing layer upon a bead (1A, 1B) comprises a chlorine-quenchable fluorescent probe (e.g. Lucigenin) such as is discussed above, then salinity may be determined by measuring the chlorine content of the water since this is an abundant constituent, as a result of the presence of salt (NaCl). The detector unit may be arranged to implement an empirical relationship between the salinity (S[%]) of water and its chlorine content (Cl$^-$[%]), or "chlorinity", which may take the form:

$$S[\%]=a_1+a_2Cl^-[\%]$$

Figure 6D:
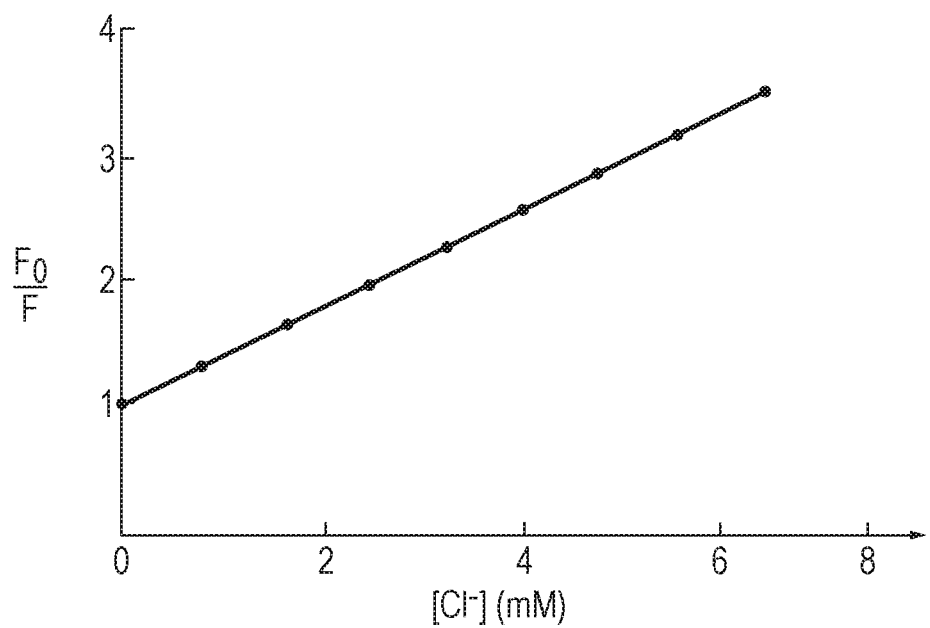
FIG. 6D schematically shows the typical quenching effect of Chlorine content (salinity) on the fluorescence intensity response (F) of Lucigenin, relative to an unquenched fluorescence intensity response ($F_o$)

The constants $a_1$ and $a_2$ may be pre-stored in the detector unit. The chlorinity of salt water resulting from its salinity, has a quenching effect on the fluorescence intensity of Lucigenin. The detector may be arranged to apply the measured fluorescence intensity (F), which may be a relative intensity (F/F$_0$) by inserting that intensity value in to a Stern-Volmer equation:

$$F_0/F=\{1+a_3Cl^-[\%]\}$$

an example of which is shown graphically in FIG. 6D. The detector unit may be arranged to invert that Stern-Volmer equation to derive a value for Cl$^-$[%] and from that a measure of salinity (e.g. S[%]=$a_1+a_2$Cl$^-$[%]) if the luminophore is Lucigenin for example (or other suitable luminophore). Thus, the salinity of water may be measured according to measurement of the extent of this quenching effect (i.e. variation in measured fluorescence intensity is a direct result of variation in Cl$^-$[%]). In this way, the detector unit may be arranged to calculate a value of the temperature and/or pressure and/or salinity of the monitored ocean environment and to out put the result 25.

Lucigenin (bis-N-methylacridinium) is a fluorophore that absorbs light up to a wavelength of 460 nm and emits with a maximum signal at 505 nm. It can be used to determine salinity as chloride ions quench the fluorescence. Both the emission intensity and lifetime fluorescence decrease in response to increased salinity; for ocean water containing on average 550 mM of chloride ions, both the fluorescence intensity and lifetime will be halved compared with pure water. As noted, a second fluorophore, insensitive to the environment can also be incorporated into the bead to provide a reference intensity signal. Alternatively, the received signal can be analysed to determine the lifetime of the fluorescence using a fast (500 MHz bandwidth) detector.

In a preferred embodiment, the sensing layer may comprise not one but two different photo-luminescent materials, such as a first indicator photo-luminescent material which is sensitive to the monitored property of the environment, and a second reference photo-luminescent material which is not sensitive to the monitored property and is preferably insensitive to the properties of the environment (e.g. insensitive to temperature, pressure, salinity etc.). The indicator and reference photo-luminescent materials may be arranged to be excitable to fluoresce by the same incoming light (5) from the light source, and may be arranged to emit at the same fluorescence wavelength, or different fluorescence wavelengths as desired. The indicator and reference photo-luminescent materials may be mixed together in the sensing layer or may be arranged separately in adjacent parts of the sensing layer. Alternatively, the reference photo-luminescent material may be arranged elsewhere upon the body of the optical element (1A, 1B). Most preferably, the decay lifetime of the reference photo-luminescent material is at least 100 times greater than that of the indicator photo-luminescent material so that it provides an effectively constant background photo-luminescent mission during the decay lifetime of the indicator photo-luminescent material. This arrangement of indicator and reference photo-luminescent materials renders the optical element suitable for detection by a process of Dual Luminophore Referencing (DLR), discussed in detail below.

A laser source (22) in the blue/green region is well matched to both the transmission band of seawater, and the absorption bands of sensing materials. For sensing layers with multiple emission wavelengths, such as that shown in FIG. 6C for a combined QD/PtTFPP sensor, it is preferable to use a laser at the shorter blue end of the range in order to allow sufficient wavelength discrimination. The use of a short pulse laser also enables the return signal to be time-gated, further reducing background signal, as well as enabling the range to the retro-reflector to be determined. Examples of compact, suitable solid-state lasers are based on the third harmonic of either the 1.32 μm output of a Nd:YAG laser or the 1.34 μm output of a Nd:YVO$_4$; these generate blue light at 440 nm and 447 nm respectively.

FIG. 2A illustrates schematically, an optical element 1A positionable within an environment to be sensed remotely using light (5, 6). The optical element comprises a mm-sized optically transparent sphere 4 (glass or plastic may be used) bearing upon substantially its entire surface a coating of a photo-luminescent material 2 of substantially uniform thickness. This coating, also referred to herein as the "sensing layer", is partially transmissive at optical wavelengths of light thereby to allow incident optical radiation 5 to pass through it into the body of the bead 4, and to allow photo-luminescent light 6 from the sensing layer to exit the optical element.

The diameter of the bead is preferably between about 1 mm and about 10 mm, and preferably between about 2.5 mm and about 7.5 mm, more preferably between about 4 mm and about 7 mm, such as about 5 mm or 6 mm. This diameter range preference applies not only to the spherical beads described in the present embodiment, but also to embodiments (not shown) in which the bead 4 is more generally spheroidal and the 'diameter' refers to the larger axis thereof. The photo-luminescent layer preferably has an absorption coefficient (A) of about 0.5, though other values may be employed in the range of about 0.25 to about 0.75, or preferably about 0.35 to about 0.65, or more preferably about 0.45 to about 0.55.

Over-coating this photo-luminescent layer is a reflective optical coating 3 arranged to retro-reflect incident light 5 emanating from a light source (22, FIG. 1), and simultaneously reflect/direct photo-luminescent light 6 from the sensing layer out from the optical element in substantially the direction to the incident light and back towards the light source. The reflective coating is partially transmissive at optical wavelengths of light, and extends over substantially the entire surface the coating of photo-luminescent material. This permits incident optical radiation 5 to pass through the optical coating into the body of the bead 4, and to allow photo-luminescent light 6 from the sensing layer to exit the optical element through the reflective layer. A balance is found between providing a sufficiently transmissive optical coating that allows ingress and egress of light in this way, yet at the same time providing sufficient reflectivity via the optical coating to enhance the retro-reflective action of the bead as a whole.

The optical coating is of substantially uniform thickness and reflectivity over substantially the whole of the surface of the bead photo-luminescent coating to ensure a substantially uniform retro-reflective effect. The refractive index (n) of the bead may be n>2 most preferably if the bead is to be used in water (e.g. marine environments), and may be about n=2 if used in air (e.g. atmospheric use or use on land/non-marine). This optimises or improves the convergence of incident light at the coated surface of a bead internally.

Consider a surface reflectivity of an optical element "R" that produces a return signal, "S". In purely retro-reflection terms, S is given by:

S=(fraction of incident light transmitted by first surface)×(reflectivity of back surface)×(fraction of light transmitted by first surface on return pass)

i.e. $S=(1-R_1) \cdot R_1 \cdot (1-R_1)$      Eq.(1)

where $R_1$ is the surface reflectivity $S = R_1 - 2R_1^2 + R_1^3$

Differentiating with respect to $R_1$ gives:

$$\frac{dS}{dR_1} = 1 - 4R_1 + 3R_1^2$$

Thus, S is maximised when $R_1$=0.333. This gives $S_{max}$=~15%.

By sandwiching the sensing layer 2 between the surface of the bead 4 (e.g. a sphere) and the reflective optical coating 3, as shown in FIG. 1, a spectrally modified optical return signal 6 is generated by the photo-luminescent coating at both the front and rear surface of the sphere, with the latter being efficiently retro-reflected. The sensing layer is preferably thin compared with the sphere's radius in order to enhance the retro-reflective properties of the bead. Thus, the photo-luminescent optical output 6 of the sensing layer, generated in response to absorption of the incident optical radiation 5 from the remote light source (22, FIG. 1), is spectrally distinct from the incident radiation and can be remotely detected as such.

The sensing layer may preferably have a thickness substantially matching a few wavelengths ($\lambda_i$) of the incident light from the light source. The thickness may be between about 10 μm and 100 μm thick, or preferably between about 40 μm and 50 μm thick. Preferably, the sensing layer is substantially uniformly thick across the surface it coats.

If the sensing layer converts a fraction A of the incident light 6 of wavelength $\lambda_i$ into a photo-luminescent optical signal 6 of shifted wavelength, $\lambda_S$, Eq.(1) becomes modified to:

$S_S = (1-R_1)^2 (1-A) \cdot R_1 \cdot A$      Eq.(2)

Here, $S_S$ is wavelength-shifted photo-luminescent optical signal 6. Since $R_1$ and A are independent variables, $S_S$ is maximised when A=0.5 and as before $R_1$=0.3 giving a signal of ~3.7%. This is further enhanced by the use of a wavelength selective optical coating 3 which may be optimised to be anti-reflective to incident light 5 at the exciting wavelength ($R_i$=0), but possess a finite reflectivity for photo-luminescent light 6 at the shifted wavelength ($R_S$). Hence Eq.(2) becomes:

$$S_S = (1 - R_i)(1 - A) \cdot R_S \cdot (1 - R_S) \cdot A \qquad \text{Eq.(3)}$$
$$= (1 - A) \cdot A \cdot (1 - R_S) \cdot R_S$$

This is maximised when both A and $R_S$=0.5, giving $S_S$=$0.5^4$ or 6.3%. The values of A and $R_S$ may be adjusted by design methods readily available to the skilled person, such as by using multi-layered optical coatings (to control $R_S$) and by controlling the photo-luminescent layer thickness or the concentration of photo-luminescent material (e.g. dye) within it.

For in-air use, in which the optical elements are within air, the bead(s) (e.g. spheres) may be made from a material with a refractive index of about 2.0. For example, S-LAH79 glass (n=2.00) may be used. This ensures that the incident light from the light source (e.g. laser) is tightly focussed onto the back surface of the bead, maximising retro-reflectivity. The wavelength of incident light may be preferably not greater than about 500 nm (e.g. blue/green excitation light) and the photo-luminescent layer may be arranged to produce luminescent light of about 550 nm wavelength (e.g. yellow/green luminescent light).

In other uses, such as in water, the refractive index of the bead(s) may be higher to achieve the same effect. Suitable optical glasses and other materials (plastics) maybe employed such as are readily available to the skilled person. FIG. 2B illustrates an alternative optical element 1B comprising a glass or plastic bead 13 (e.g. sphere) as before, but in this example the bead is optionally only partially coated with photo-luminescent material and bears the photo-luminescent material 11 optionally only on substantially one half of the surface of the bead. In variants of this design, the bead 13 may have less than half of its surface so coated, as long as sufficient surface area of the bead remains coated to provide a suitably high scattering cross-section to incident radiation 5. In other embodiments, the bead may bear a reflective optical coating (3, 10) on some but not all of its surface. In other embodiments, the bead may bear the photo-luminescent sensing layer exposed on some parts of its surface, and not covered by a reflective layer or other covering. The surface area of the bead which is free of photo-luminescent material is coated with an optical coating 12 which is preferably highly, or substantially fully anti-reflective at optical wavelengths of light including both the incident light 5 of the light beam and the photo-luminescent light signal 14. In this way, both the excitation light 5 from the incoming light beam, and the photo-luminescent light 14 generated by the sensing layer 11, are able to efficiently transmit through the surface of the bead 13 with minimal (or at least less) loss due to reflection. Consequently, the sensing layer 11 may serve the function purely of being a generator of photo-luminescent light and need not be constrained by requirements of being suitably transmissive to incoming light 5 from the light source 22. Furthermore, the back/outer surface of the sensing layer 11 may be coated with a highly (e.g. substantially totally) reflecting optical coating 10 for reflecting/directing towards the parts of the bead coasted with the anti-reflecting coating 12, any photo-luminescent light generated by the sensing layer. The reflectivity of the reflective coating 10 may preferably be highly reflective at optical wavelengths including both the excitation light 5 and the photo-luminescent light 14 generated by the sensing layer. In this way, if any quantity or portion of the exciting light initially passes through the sensing layer unabsorbed by it, then the reflective coating 10 may reflect that portion of light back into the sensing layer to be absorbed thereby to excite photo-luminescence. This enhances the efficiency of conversion of excitation light 5 into photo-luminescent light 14.

In principle, such a device may provide signal efficiency at the shifted wavelength of the photo-luminescent light.

This embodiment may be most useful when the optical element 1B is positioned within the environment to be sensed in such a way that the some or all of the anti-reflective surface parts 12 of the optical element are more likely than not to be facing in the direction of the light source 22 so as to receive incoming excitation light 5. This may be most suitable when the optical element is substantially static within the environment in question. Alternatively, a large number of non-static such optical elements may be employed collectively to monitor a dynamic environment (e.g. a fluid) in which the optical elements move freely. In that case, one may find that, amongst the optical elements collectively, at a given time, on average, the proportion of reflective optical coating presented towards a light source 22 (which obscures the sensing layer from the light source) substantially matches the proportion of anti-reflective optical coating presented towards a light source (which openly presents the sensing layer to the light source), when counted across all of the elements at one time. Consequently, the loss of photo-luminescent signal 14 caused by obscuration by the reflective layer may be more than compensated for by the gain in photo-luminescent signal achieved by enhanced signal generation through the proportion of anti-reflective layer presented to the light source.

Figure 3:
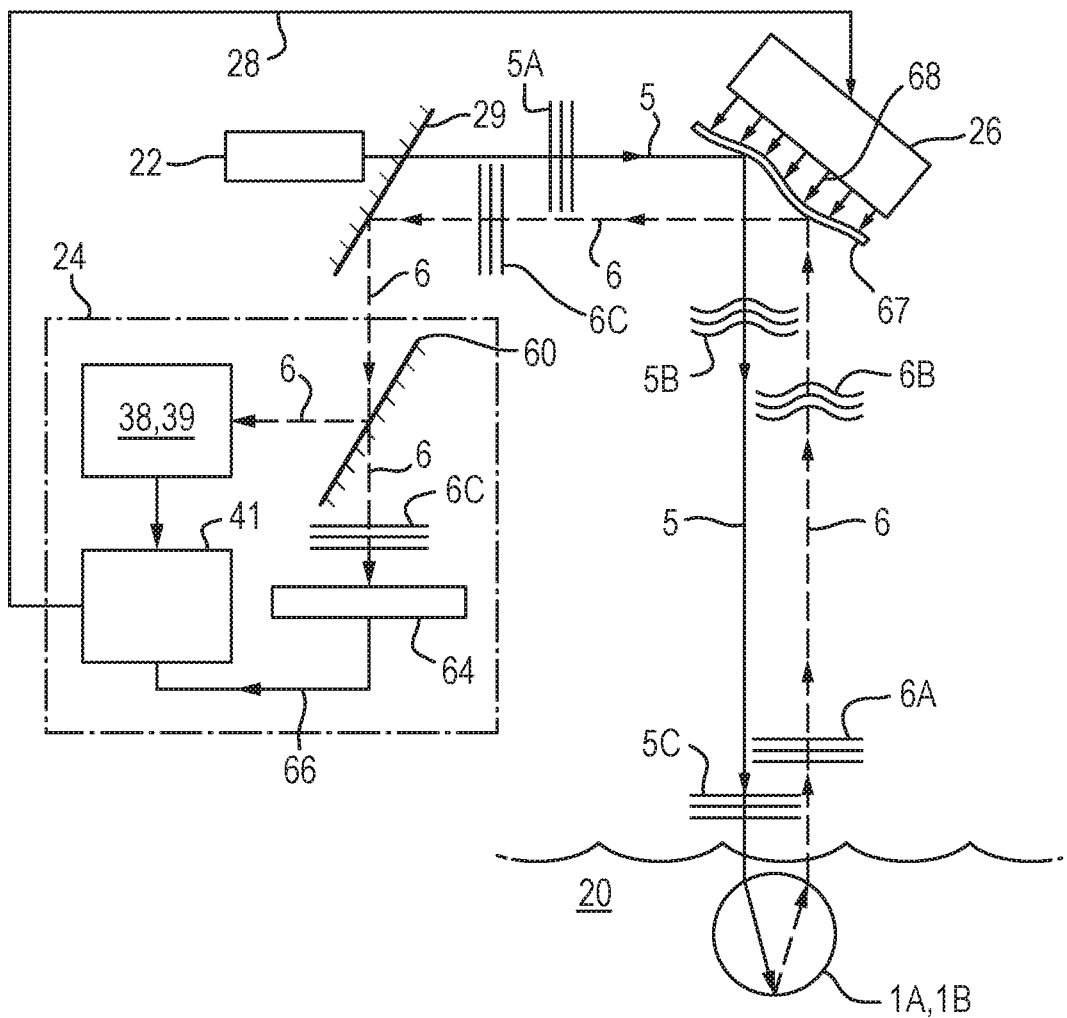
FIG. 3 schematically shows the system of FIG. 1 in more detail.

FIG. 3 illustrates the system of FIG. 1 in more detail. FIG. 3 schematically illustrates a system for remotely sensing light (6) emanating from one or more retro-reflective optical elements (1A or 1B) within a monitored environment (20) such as the open sea. The system comprises an illuminator including the laser light source (22) and a reflector unit (26; part of front-end optics 23 of FIG. 1) comprising a deformable mirror (67) arranged to receive light (5, 5A) from the light source and to reflect the received light thereby to output illumination light (5, 5B) from the illuminator for illuminating the optical elements (1A or 1B) within the monitored environment.

The detector (24) of the system is arranged to receive light (6, 6C) returned by the one or more retro-reflective optical elements in response to the illumination light (5, 5A). The returned light is initially received at the deformable mirror of the reflector unit and is reflected thereby to the detector unit by the first plane mirror (29) of a pair of plane mirrors (29, 60). The latter plane mirror (60) of the pair of plane mirrors is located within the detector and is partially reflective and partially transmissive such that some of the returned light (6) is reflected thereat towards the optical input of an analysis unit (38, 39) of the detector, and the remainder is transmitted through the mirror to pass to the optical input of a wavefront sensor (64).

The returned light received by the wavefront sensor has a wavefront (6C). The wavefront sensor is arranged to determine the shape of that wavefront. Simultaneously, the analysis unit (38, 39) is arranged to detect a property (e.g. temperature, pressure, salinity) of the monitored environment according to e.g. the relative intensity of the returned light (6).

The wavefront sensor (64) is arranged to generate output data conveying the shape of the wavefront (6C) of the received light, and to output that data (66) to a controller unit (41) which is arranged to respond to the data by calculating the phase conjugate shape of the wavefront and to use that conjugate shape to generate appropriate mirror deformation control signals (28) for adjusting the deformation of the deformable mirror accordingly. Of course, if the wavefront (6C) of the returned light received by the wavefront sensor is substantially plane parallel, then the phase conjugate shape of that wavefront is substantially no different to the received wavefront (6C) and the mirror deformation control signals are effectively null (i.e. effecting "no change"). However, if the wavefront of the light (6C) received by the wavefront sensor deviates from plane parallel, then the phase conjugate shape of that wavefront will differ from the non-conjugate shape, and the mirror deformation control signals will effect a change in the shape of the deformable mirror accordingly.

The reflector unit (26) comprises a continuous reflecting area (67) the surface shape of which is deformable by a plurality of sub-surface actuators (68) coupled thereto. A deformable mirror may be used such as is readily available to the skilled person. The stroke of each actuator is preferably greater than about 10 μm, and the extension of each actuator is controlled by the reflector unit according to the mirror deformation control signals so as to adjust the mirror deformation by adding a deformation to the existing shape of the deformable mirror, which may typically already be deformed, which matches the shape of the phase conjugate of the wavefront (6C) determined by the wavefront sensor (64).

The reflector unit is positioned to receive light (5) output from the laser light source (22). This received light has a substantially plane-parallel wavefront (5A) when received, and is reflected by the deformable mirror (67) of the reflector unit as output illumination light. The output illumination light is thereby provided with a modified wavefront (5B) which is pre-distorted to match the shape of the distorted wavefront (6B) of returned light received at the reflector unit from the remote optical elements.

In this way, the system imposes upon illumination light a wavefront pre-distorted to anticipate the distorting effect of the optical path to be traversed by the illumination light on its way to the optical elements (1A, 1B). By anticipating and at least to some extent counteracting the expected distortions that will be applied to the wavefront (5B) of outgoing illumination light, it is possible to permit the illumination light to reach a target optical element with a less distorted wavefront (5C) which the optical element is able to interact with more effectively. The optical element may then receive the illumination light in a more spatially stable manner with less scintillation. Consequently, the illumination light (5C) may be better at staying 'on target' by the time it reaches the optical element. This has the effect of significantly improving the amount of light (6A) that is subsequently returned by the optical element.

The illuminator is arranged to output the illumination light in the form of successive pulses of light at a pulse rate of about 10 kHz, for example. The illuminator is arranged to change the deformation applied to the deformable mirror preferably about once every successive 100 light pulses output from the illuminator. The resonant frequency of the deformable mirror (e.g. the lowest resonance frequency if there are several) is greater than about 1 kHz. The product (S×F) of the value (S) of the stroke of an actuator and the value of the lowest resonance frequency (F) of the deformable mirror is about S×F=6×10$^{-2}$ HertzMetres. It has been found that this product of parameters (S×F) is an effective 'figure of merit' for the deformable mirror and constraining the value of the figure of merit in the manner described above has been found to provide optimal performance in terms of responsiveness and efficacy.

The deformable mirror (67) is also arranged to receive the returned light (6B) from optical elements (1A, 1B) in the monitored environment. The detector (24) and the analysis unit (38, 39) within it, are arranged to receive the returned light as reflected from the deformable mirror. Thus, the deformable mirror is arranged both to apply a pre-deformation (5B) to the un-deformed wavefront (5A) of illumination light generated by the light source, and also to substantially (or at least partially) un-deform (6C) the deformed wavefront (6B) of returned light. The same mirror deformation is applied to both the outgoing light pulse (5B) and the light (6B) returned by an optical element in response to that outgoing pulse. As the optical path between the two changes over time, so too does the deformation applied (i.e. updated) to the deformable mirror in order to account for that.

Figure 4:
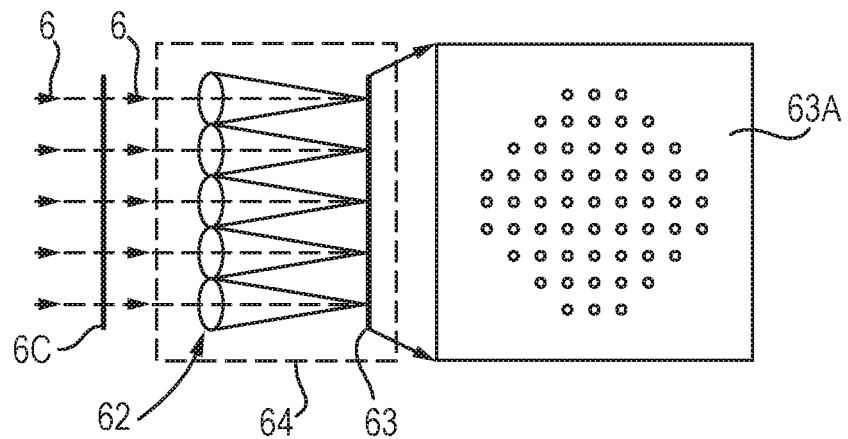
FIG. 4 schematically shows a wavefront sensor, and an image formed upon a CCD photo-sensor screen thereof as formed by a lenslet array thereof.

Referring to FIGS. 4 and 5, the wavefront sensor (64) is arranged to measure aberrations in optical wavefronts and comprises a lenslet array (62) arranged to break-up/segment the pupil plane of the wavefront sensor into sections. The lenslets of the array of lenselets all have the same focal length and each lenslet is arranged to focus a part of the pupil plane onto a CCD sensor array (63), thereat to form a corresponding array of a plurality of respective images (63A). The controller unit (41) of the detector is arranged to compare the pixel coordinate positions, upon the photosensor array (63A), of the respective images formed by the lenslet array, and to determine a wavefront therefrom. This determining may be according to adaptive optics techniques readily available to the skilled person. For example, the wavefront sensor may be a Shack-Hartmann wavefront sensor.

The controller unit (41) is arranged to receive the wavefront shape determined by the wavefront sensor, and to calculate the phase error ($e^{-i\Theta}$) at points along the incoming wavefront (6C) relative to a plane-parallel wavefront, and then to calculate the conjugate of the phase error ($e^{+i\Theta}$) at each corresponding point. When this conjugate phase error is applied to a wavefront possessing the original phase error, the result is to cancel-out the original phase error at the respective points along the wavefront. This is illustrated schematically in FIG. 5. Accordingly, the controller unit (41) is arranged to calculate the conjugate phase error associated with the wavefront (6C) it receives from the deformable mirror, and to calculate the required mirror deformation control signals (28) for adding a deformation to the deformable mirror matching that phase-conjugate shape.

Preferably, in the system according to preferred embodiments of the invention, the deformable mirror (67) is also a tiltable mirror arranged to adjustably tilt, point or face in a desired direction in response to a tracking signal for adjusting the direction of the illumination light to maintain illumination of an optical element. The controller unit (41) may then further provide the function of a tracker arranged to generate a tracking signal according to changes in the position of an image formed from the returned light (6C) received at the wavefront sensor (64). Light received by the lenslet array (62) of the wavefront sensor is focussed to form a corresponding array of a plurality of respective images (63A) upon the photosensor array (63) thereof, as is shown schematically in FIG. 4. The controller unit (41) may be arranged to monitor the pixel position, upon the photosensor array, of some or each of these images and to determine a pixel coordinate position of the centroid of the image array representative of the global image. The controller unit may be arranged to detect a change of coordinate position of the centroid in order to detect a global image movement indicative of relative movement between the illuminator and the illuminated optical elements. In response to this, the controller unit may generate a tracking signal (28, FIG. 7) accordingly to change the orientation of the deformable mirror in such a way as to at least partially reverse the detected image movement thereby to re-aim the illumination light upon the optical element(s) as appropriate. The controller unit may be arranged to issue tracking signals necessary to maintain the centroid of the global image (63A) centred upon the CCD sensor array (63). An example of this is shown with reference to FIG. 7. It assists in maintaining a stronger optical return signal for use in detecting a property (pressure, temperature, salinity etc.) of the monitored environment by detecting changes in the returned luminescence signal from the sensing layer upon a remote optical element within the monitored environment. A technique of Dual Luminophore Referencing may be applied to this end.

Dual Luminophore Referencing

Dual Luminophore Referencing, also known as Dual Lifetime Referencing or Phase Modulation Resolved Fluorescence Spectroscopy, is a method for detecting the luminescence intensity of a luminescent material. Unlike other luminescence intensity detection schemes, it does not rely on direct luminescent intensity measurements which can be susceptible to a variety of interfering factors each of which will influence a directly detected intensity signal. Examples include position changes in the luminescent material relative to the detector, or in the light scattering or turbidity of the medium between the luminescent material and the detector.

Dual Luminophore Referencing (DLR) is a radiometric method whereby a luminescent material is used which has a fluorescent intensity that is dependent upon, or sensitive to, the quenching effect of an analyte material (e.g. chlorine in a water) upon the luminescent material. Two luminophores are present at an analyte sensing region—an 'indicator' luminophore having the analyte sensitivity, and a 'reference' luminophore which is unaffected by the presence of any analyte either because it is inherently unaffected or is protected from being quenched by the analyte.

The indicator luminophore is selected to have a relatively short luminescence decay time ($\tau_{ind}$) whereas the reference luminophore is selected to have a relatively long luminescence decay time ($\tau_{ref}$). The indicator and reference luminophores desirably have overlapping excitation spectra so that they can be excited by the same wavelength of incident light (e.g. one common light source).

In use, a sinusoidal excitation signal applied to the two different luminophores causes them to generate two different respective luminescence signals at the analyte sensing region. These two luminescence signals are phase-shifted in time, relative to each other, as is the net luminescence signal resulting from the combination of them. One may obtain a value of the luminescent intensity of the indicator luminophore relative to the luminescent intensity of the reference luminophore by measuring these phase-shifts. Since the luminescent intensity of the reference luminophore is insensitive to the analyte, and changes detected in the luminescent intensity of the indicator luminophore are a direct result of the presence of the luminophore. The signals of both luminophores are equally susceptible to other interferences such as distance, turbidity or scattering effects upon luminescent light signals. Thus, the interferences cancel-out in the relative intensity values obtainable using DLR.

In more detail, when a luminophore is excited by an impulse of light, fluorescent photoemission intensity I(t) of the luminophore, after the pulse has ended, is an exponentially decaying value. For a plurality of luminophores excited in common by the impulse, the overall fluorescent intensity decays as a multi-exponential function $I(t)=\Sigma_i a_i \exp(-t/\tau_i)$ where $a_i$ and $\tau_i$ are the decaying amplitudes and lifetimes of the $i^{th}$ component luminophores.

In frequency-domain lifetime measurement techniques, such as DLR, a target luminophore is exposed to an excitation light intensity which is modulated harmonically at an angular frequency $\omega$ and a modulation degree of $m_E$ where:

$$E(t) = E_0[1 + m_E \sin(\omega t)]$$

The periodic excitation causes a given single luminophore of decay lifetime $\tau$ to emit fluorescent light F(t) with the same intensity modulation frequency, $\omega$. However, a phase lag is present in the fluorescence signal due to the finite fluorescence lifetime of the luminophore such that:

$$F(t) = F_0[1 + m_F \sin(\omega t - \varphi_F)],$$

having a modulation degree of $m_F$. This arises from the extended effect of the harmonically modulated excitation light upon the instantaneous response (exponential decay) of the luminophores. This extended effect can be determined by considering the instantaneous impulse-response of a luminophore, and convolving that one the extended harmonic excitation, as follows:

$$F(t) = \int_0^t E(t') F_\delta(t-t') dt'$$

Here, $F_\delta$ is the impulse-response of a fluorophore to an impulse of excitation light:

$$F_\delta(t-t') = e^{-(t-t')/\tau}.$$

The convolution integral gives:

$$F(t) = E_0 \tau - E_0 \tau \left\{ \frac{1 - m_E \omega t}{1 + \omega^2 \tau^2} \right\} e^{-t/\tau} + \frac{m_E E_0 \tau}{1 + \omega^2 \tau^2} \{\sin(\omega t) + \omega \tau \cos(\omega t)\}.$$

If $\tau \ll t$ then the exponentially decaying middle term in the above expression is negligible and we have:

$$F(t) = E_0 \tau + \frac{m_E E_0 \tau}{1 + \omega^2 \tau^2} \{\sin(\omega t) + \omega \tau \cos(\omega t)\}.$$

Using the well-known trigonometric identity that:

$$a \sin(x) + b \cos(x) = c \sin(x+\varphi); c^2 = a^2 + b^2; \varphi \arctan 2(b, a)$$

We may write that for an individual luminophore, the fluorescent response to the harmonic excitation light is:

$$F(t) = E_0\tau + \frac{m_E E_0 \tau}{\sqrt{1+\omega^2\tau^2}}\sin(\omega t - \varphi_F); \varphi_F = \arctan(\omega\tau),$$

Thus, the response is sinusoidal with a phase lag $\varphi_F$. If there are a plurality of luminophores simultaneously excited in this way, the total response is simply the sum of the individual responses. By using the well-known trigonometric identity (also known as 'Phasor Addition') that:

$$\sum_i a_i \sin(\omega t + \varphi_i) = a \sin(\omega t + \Phi);$$

$$a^2 = \sum_{i,j} a_i a_j \cos(\varphi_i - \varphi_j); \tan(\Phi) = \frac{\sum_i a_i \sin(\varphi_i)}{\sum_i a_i \cos(\varphi_i)}.$$

we may write the total response from all luminophores as:

$$F(t) = A_0 + A_1 \sin(\omega t - \varphi_T),$$

where, $$A_1^2 = \sum_{i,j} F_i F_j \cos(\varphi_i - \varphi_j)$$

and, $$\tan(\varphi_T) = \frac{\sum_i F_i \sin(\varphi_i)}{\sum_i F_i \cos(\varphi_i)},$$

in which each of the $F_i$ terms (or $F_j$ terms) is the constant amplitude $$\left(\frac{m_E E_0 \tau_i}{\sqrt{1+\omega^2\tau_i^2}}\right)$$

of the sinusoidal harmonic term in the $i^{th}$ luminophore response signal, and where $A_0$ is the sum of all the constant terms ($E_0\tau_i$) from each of the i luminophore response signals.

Thus, if a harmonically modulated excitation light is applied simultaneously to an 'indicator' ("1") luminophore and a 'reference' ("2") luminophore, the net fluorescence signal would simply be the sum of the fluorescence signal from each:

$$F(t) = F_1[1+m_1\sin(\omega t-\varphi_1)] + F_2[1+m_2\sin(\omega t-\varphi_2)]$$

Which is itself simply a harmonic function which is the total ("T") of the two contributing fluorescence signals:

$$F(t) = F_T[1+m_T\sin(\omega t-\varphi_T)]$$

Thus, $$F_T[1+m_T\sin(\omega t-\varphi_T)] = F_1[1+m_1\sin(\omega t-\varphi_1)] + F_2[1+m_2\sin(\omega t-\varphi_2)]$$

Applying cosine and sine transforms to each side of this equation yields:

$$A_T\sin(\varphi_T) = A_1\sin(\varphi_1) + A_2\sin(\varphi_2)$$

$$A_T\cos(\varphi_T) = A_1\cos(\varphi_1) + A_2\cos(\varphi_2)$$

Here, $A_i = F_i m_i$ and $\varphi_i = \arctan(\omega\tau_i)$.

If $\omega\tau_i \ll 1$, then $\varphi_i \approx 0$.

Thus, if the 'indicator' luminophore is selected to have a very short decay lifetime, then $A_1\sin(\varphi_1) \approx 0$ and $A_1\cos(\varphi_1) \approx A_1$. Thus, the above equations reduce to:

$$A_T\sin(\varphi_T) = A_2\sin(\varphi_2)$$

$$A_T\cos(\varphi_T) = A_1 + A_2\cos(\varphi_2)$$

Dividing the bottom equation by the top one gives:

$$\cot(\varphi_T) = \frac{A_1 + A_2\cos(\varphi_2)}{A_2\sin(\varphi_2)} = \cot(\varphi_2) + \left(\frac{A_1}{A_2}\right)\frac{1}{\sin(\varphi_2)}$$

Rearranging this gives:

$$\left(\frac{A_1}{A_2}\right) = (\sin(\varphi_2)) \times \cot(\varphi_T) - \cos(\varphi_2) = M \times \cot(\varphi_T) + C$$

This is a simple linear equation in which a measured phase delay ($\varphi_T$) of the total fluorescence signal is directly proportional to the ratio of the 'indicator' fluorescence intensity and the 'reference' fluorescence intensity. The phase delay ($\varphi_2$) of the 'reference' luminophore is known or can be directly measured from the gradient (M) and intercept (C) value of the straight-line correlation between the directly measured quantity $\cot(\varphi_T)$ of the total fluorescence signal and the analyte-dependent relative fluorescent intensity $$\left(\frac{A_1}{A_2}\right).$$

Of course, because the 'reference' luminophore was selected to be insensitive to the presence of the analyte, the value of $\varphi_2$ remains unchanged and so the values of M and C are constant, and $$\varphi_2 = \arctan\left(\frac{-M}{C}\right).$$

In this way, in summary, Dual Luminophore Referencing (DLR) takes advantage of a phase shift $\varphi_T$ in the combined luminescent response of two luminophores caused by the harmonic amplitude/intensity modulation of an excitation laser light source common to both. One of the luminophores, referred to as the 'indicator' which is sensitive to the presence of the analyte substance, may typically have a fluorescent decay time or the order of nanoseconds, and the other (acting as the 'reference') may have a decay time in the microseconds range. The two luminophores used in DLR typically have similar spectral properties so that they can be excited at the same wavelength, if desired. Their emission may possibly be detected using the same detector, if desired. The phase shift $\varphi_T$ of the overall luminescence return signal from the two luminophores depends on the ratio of intensities of the 'reference' luminophore and the 'indicator' luminophore.

The reference luminophore is preferably arranged to give very slowly changing (e.g. effectively a constant) background signal while the fluorescence of the indicator depends on the analyte concentration. Therefore, the phase shift $\varphi_T$ of the combined, measured, fluorescence signal directly reflects the intensity of the indicator luminophore and, consequently, the analyte concentration.

For measurements employing Dual Luminophore Referencing (DLR) techniques, the laser light source (22) may be sinusoidally modulated in intensity (frequency-domain). A low-pass filter with a cut-off wavelength of 530 nm may be used to filter received optical signals (6) from the illuminated optical elements (1). The detector unit (24) may be arranged to measure $\varphi_T$, the phase angle of the overall signal and optionally $\varphi_2$, the phase angle of the reference luminophore (if not already known), and to apply the above equation to generate a value for the relative intensity ratio of $$\left(\frac{A_1}{A_2}\right).$$

The detector unit may then use this result by defining a parameter value $$F = \left(\frac{A_1}{A_2}\right).$$

This parameter value may be inserted in the Stern-Volmer equation (e.g. $F_0/F = \{1 + a_3 Cl^-[\%]\}$) and the detector unit may be arranged to invert that Stern-Volmer equation to derive a value for $Cl^-[\%]$ and from that a measure of salinity (e.g. $S[\%] = a_1 + a_2 Cl^-[\%]$) if the luminophore is Lucigenin for example (or other suitable luminophore). Alternatively, the sensing luminophore may be a Quantum Dot material and/or PtTFPP and the data analyser may be arranged to use the relative intensity value $$F = \left(\frac{A_1}{A_2}\right)$$

to calculate a pressure and/or temperature value as discussed above.

Figure 7:
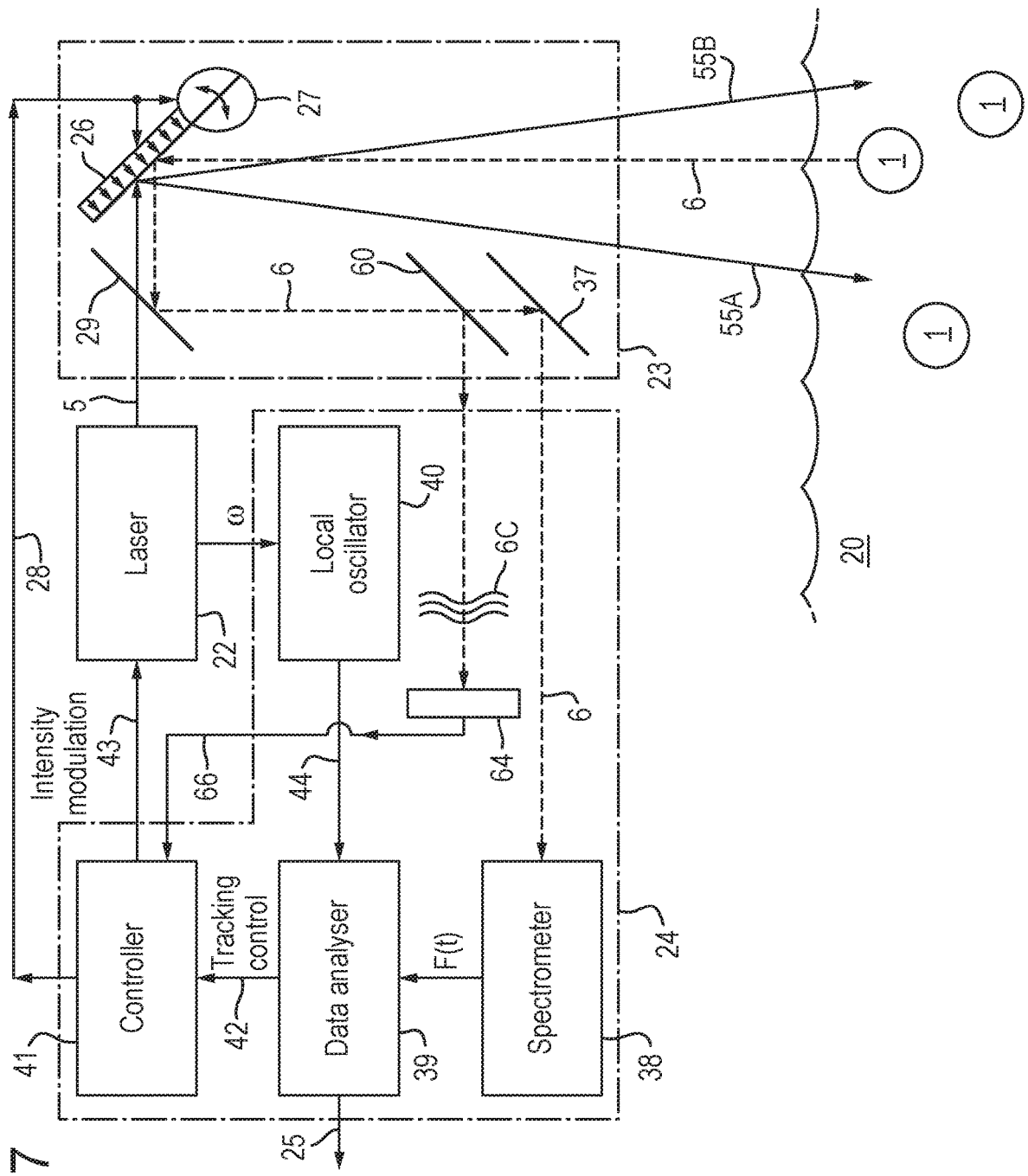
FIG. 7 schematically shows a detailed example of a system of FIG. 3 according to a preferred embodiment employing Dual Luminophore Referencing (DLR)
Figure 8:
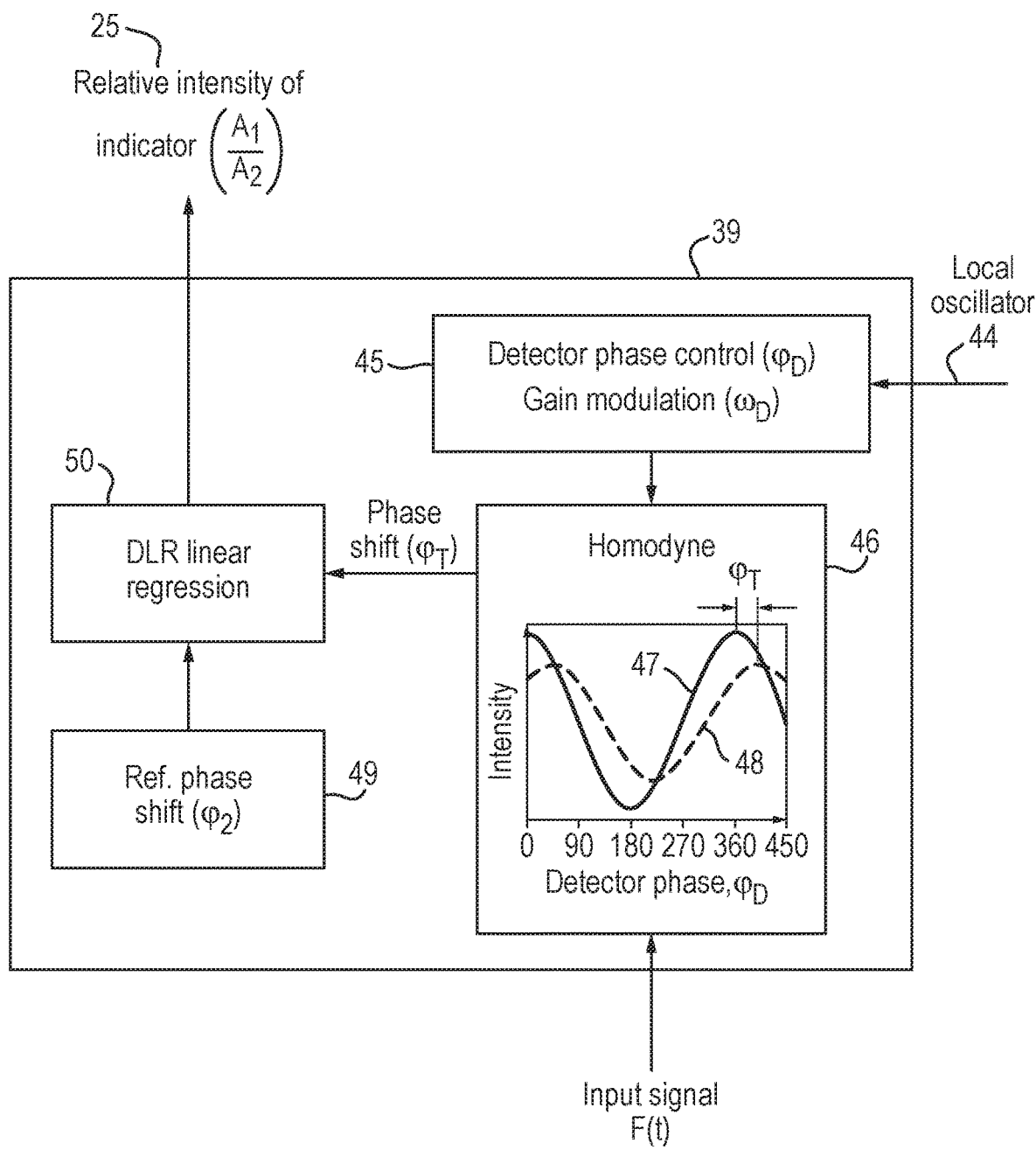
FIG. 8 schematically shows a component part of the system of FIG. 7 in more detail.

FIG. 7 and FIG. 8 schematically show a more detailed example of a system (21) for remotely measuring properties of a monitored environment as has been described more generally with reference to FIG. 3. The embodiment illustrated in FIGS. 7 and 8 is intended to apply the technique of DLR as discussed above. This is applicable whatever indicator luminophore is used, and for what ever physical property of the monitored environment, provided it is used in conjunction with a reference luminophore present anywhere upon or within the optical elements (1) to be illuminated by the light source (22) of the system.

The front-end optics unit (23) comprises a tracking output mirror 26 arranged to receive excitation light (5) from a laser light source (22) and to reflect the received light in a desired direction determined by the particular tilt angle of the tracking output mirror. The tilt angle is controlled by a tilt controller unit (27) arranged to implement a desired mirror tilt angle receive in accordance with a mirror tilt signal (28) received thereby from a controller unit (41) of the detector unit (24). The change in direction (5A, 5B) of the excitation output light reflected by the tracking output mirror, when tilted at two different mirror orientations, is schematically in FIG. 7. The laser unit is controlled by a modulation control signal (43) from a controller unit (41) to generate a light output (5) having an intensity that is modulated with a sinusoidal modulation having a modulation angular frequency ($\omega$) of about 45 kHz. An illuminated optical element (1) bears an indicator luminophore (e.g. Quantum Dot, PtTFPP, Lucigenin, etc.) and a reference luminophore (e.g. Ru(dpp)) returns a sinusoidally modulated photo-luminescent light signal (6) containing light originating from both the indicator and the reference luminophores. The returned signal (6) also contains a component of directly retro-reflected excitation light which has reflected from the optical elements without being absorbed by the indicator or reference luminophores there.

The returned luminescence signal (6) is phase-shifted by a phase lag ($\varphi_T$) with respect to the excitation light (5) due to the differing luminescence decay lifetimes of the indicator and reference luminescent materials, whereas the retro-reflected excitation light is phase-shifted by a phase lag ($\varphi_R$) with respect to the excitation light (5) due to the range (R) of the illuminated optical element (1) from the illuminating apparatus (21). In alternative embodiments, the laser unit (22) may comprise a second laser arranged to emit a second wavelength of light having an intensity that is modulated with a sinusoidal modulation having a modulation angular frequency ($\omega_R$) which may preferably be equal to the modulation angular frequency of the excitation light (i.e. $\omega_R = \omega$, e.g. about 45 kHz). This second laser light source may be used specifically for deriving a value of the range (R) to the optical elements.

The front-end optics unit (23) is arranged to receive the returned luminescence signal (6) at the deformable tracking output mirror (26), and comprises a pair of intermediate mirrors (29, 37) arranged to reflect the received return signal (6) to an optical input of a spectrometer unit (38). The spectrometer unit is arranged to separate the photo-luminescent component of the signal from the directly retro-reflected component, and to output the separated signal components (F(t)) to a data analyser unit (39). A dichroic mirror (not shown) within the spectrometer unit may be used for this purpose, being transmissive to light of a wavelength excluding that of the excitation light (e.g. $\lambda = 532$ nm) but including the photo-luminescent light (e.g. $\lambda > 532$ nm), and being reflective to light of a wavelength including that of the excitation light but excluding the photo-luminescent light. The photo-luminescent component of the signal is then analysed according to the DLR method to determine a relative luminescence intensity of the indicator luminophore relative to the reference luminophore, and the directly retro-reflected component is analysed to determine a range value (R).

The directly retro-reflected component is compared to a local oscillator signal (44) generated by a local oscillator unit (40) which has the same angular frequency and phase as that of the excitation light generated by the laser unit (22). Using any suitable technique readily available to the skilled person (e.g. homodyne detection), the phase lag ($\varphi_R$) with respect to the excitation light (5) is determined and the range value calculated by the data analyser according to the following relation:

$$R = \frac{2c\varphi_R}{\omega}$$

Here c is the speed of light in a vacuum, and $\omega$ is the angular frequency of the modulation applied to the excitation light (5). If a second laser is employed for range-finding purposes, as described above, then term ω in the above equation is replaced with $\omega_R$.

This range value may be used by the data analyser to calibrate (e.g. normalise) the received photo-luminescent intensity value in embodiments in which DLR is not used, if desired, to give an intensity value which is, in principle, not influenced by the range (R) to the optical element.

The photo-luminescent component of the returned signal (6) is compared to the local oscillator signal (44) generated by a local oscillator unit (40) which has the same angular frequency and phase as that of the excitation light generated by the laser unit (22). Using a homodyne detection method, the phase lag ($\varphi_T$) of the photo-luminescent light with respect to the excitation light (5) is determined due to the differing luminescence decay lifetimes of the indicator and reference luminescent materials, and a relative luminescence intensity value (25) is output from which the physical property of the monitored environment (1) may be determined as described above. The homodyne determination of the relative luminescence intensity value is described in more detail with reference to FIG. 8.

Homodyne Detection

In DLR, an intensity of an 'indicator' luminophore can be obtained from measurements of the phase lag of the 'indicator' emission as compared to the excitation light. The high-frequency fluorescence signal F(t) is not measured directly in the time domain but instead converted to a low-frequency signal. This is accomplished using a homodyne detector. This employs a frequency mixing phenomenon that is well-known.

In the homodyne detection method, the excitation light intensity and the gain (G(t)) of the luminescence signal photodetector are modulated harmonically at the same frequency. The phase ($\varphi_D$) of the detector gain modulation is controllably varied. The measured signal (S(t)) is the real-time product of the fluorescence emission and detector gain and is harmonic with a certain phase difference ($\varphi_T - \varphi_D$) between the detector gain curve and the modulated excitation:

$$S(t) = \{F(t) \cdot G(t)\} \propto F_T(1 + m_T \cos(\varphi_T - \varphi_D))$$

In a homodyne system, S is measured at a series of phase steps in the detector phase angle ($\varphi_D$) covering 360 degrees, and at each phase setting the detector signal is integrated for a time period much longer than the period of the harmonic modulation applied to the excitation light and the detector gain, thereby averaging the signal. The resulting homodyne signal or phase-modulation diagram (an integral over time t) exactly preserves the phase lag ($\varphi_T$) and the demodulation of the high frequency fluorescence emission, and can be directly translated to a fluorescence intensity for the 'indicator' luminophore using the DLR method described above.

FIG. 8 schematically illustrates the data analyser unit (39) is shown in detail. The data analyser includes a homodyne unit arranged to implement the above modulation of the photo-detector gain in order to produce a homodyne signal (dashed curve, 48) of the total fluorescence emission (S(t)), showing a phase lag ($\varphi_T$). This homodyne signal is shown relative to the signal one would see for a zero-lifetime reference luminophore (solid curve, 47). In detail, the data analyser unit comprises a homodyne unit (46) containing a luminescence signal photo-detector (not shown) arranged to receive the input luminescence signal (F(t)) from the spectrometer unit, and to generate an electrical signal in proportion to the intensity of that luminescence signal. A gain control unit (45) is arranged to receive as an input the angular frequency (ω) of the sinusoidal intensity modulation applied to the excitation laser light (5), and therewith to modulate the gain (G(t)) of the luminescence signal photodetector harmonically as described above. The gain control unit is also arranged to sweep through successive values of detector phase angle ($\varphi_D$) covering 360 degrees. The homodyne unit (46) is arranged to mix the time-varying input luminescence signal with the time-varying gain of the luminescence signal photo-detector to generate an output signal $S(t) = \{F(t) \cdot G(t)\}$ as illustrated in the dashed curve (48) of FIG. 8.

The phase lag ($\varphi_T$) is determined accordingly, and output (44) to a DLR linear regression unit (50) which is arranged to implement the equation:

$$\frac{A_1}{A_2} = M \cot(\varphi_T) + C$$

as described above in order to derive a relative intensity value ($A_1/A_2$) for the indicator luminophore. A reference phase shift unit (49) contains pre-stored values for the constants "M" and "C" of the above linear equation, which can be derived from the known constant phase lag associated with the reference luminophore $M = \sin(\varphi_T)$ and $C = -\cos(\varphi_T)$.

The data analyser may be arranged to calculate a monitored property (e.g. pressure, temperature, salinity etc.) of the monitored environment by applying the relative intensity value to the known relations between that quantity and the physical properties of the reference luminophore being used—as discussed above. For example, the detector unit may define a parameter value $$F = \left(\frac{A_1}{A_2}\right).$$

The data analyser may be arranged to invert the Stern-Volmer equation:

$$F_0/F = \{1 + a_3 Cl^-[\%]\}$$

to derive a value for $Cl^-[\%]$ and from that a measure of salinity (e.g. $S[\%] = a_1 + a_2 Cl^-[\%]$), and output the result (25) if the luminophore is Lucigenin for example (or other suitable luminophore). Alternatively, the sensing luminophore may be a Quantum Dot material and/or PtTFPP and the data analyser may be arranged to use the relative intensity value $$F = \left(\frac{A_1}{A_2}\right).$$

to calculate a pressure and/or temperature value as discussed above.

This relative intensity value may be output (42) by the data analyser for input to the controller unit (41) of FIG. 7, for use by the controller unit in control of the tracking output mirror (26). The controller unit may be arranged to compare a contemporaneous value of the relative intensity signal with an immediately preceding such value, previously input to it from the data analyser unit, and to determine whether the former is greater than the latter. If the former is not greater than the latter, then the controller unit is arranged to issue a mirror tilt signal (28) to the tilt control unit (27) to implement a small change in the mirror tilt angle (e.g. a degree, arc-minute or arc-second, or a fraction/multiple thereof) and to subsequently compare the next contemporaneous value of the relative intensity signal with the immediately preceding such value. If the intensity value is increased the mirror is moved by a further tilt angle which is an increase in the previous tilt angle, otherwise, the small change in tilt angle is reversed to return the mirror to its earlier position. A new small change in mirror tilt angle is then assessed in this way in order to find the tilt angle which optimises the relative intensity signal. This is applied to each of two orthogonal tilt directions, to allow a movement of the mirror in three dimensions. Of course, each new tilt direction directs the excitation laser light beam (5) in a new direction (e.g. direction 55A to 55B) towards the optical elements (1) in the monitored environment. Thus, the controller unit may control the tracking output mirror such that the output laser beam (5) effectively tracks the optical elements (1).

In embodiments omitting the sensing layer, the detector unit may be arranged to determine the spectral profile of the returned signal and therefrom determine estimates of the presence and/or concentration of particulate or molecular species in the sensed environment, which may include the space between the retro-reflective beads and the detector (e.g. the atmosphere, body of water), according to techniques known to the skilled person. For example, by measuring the spectrum of light received at the detector from the retro-reflective bead(s), acting as a remote light source, and the intensity of light within specified spectral ranges, spectral absorption estimates may be made which allow identification of pollutants.

The embodiments described herein are presented so as to allow a better understanding of the invention, and are not intended to limit the scope of the inventive concept of the invention. Variations, modifications and equivalents to the embodiments described herein, such as would be readily apparent to the skilled reader, are intended to be encompassed within the scope of the invention.

The invention claimed is:

1. A system for remotely sensing light emanating from within a monitored environment, the system comprising:
   an illuminator including a light source and a reflector unit, the reflector unit comprising a deformable mirror arranged to receive light from the light source and to reflect the received light thereby to output illumination light for illuminating one or more retro-reflective optical elements within the monitored environment, the one or more retro-reflective optical elements bearing a photo-luminescent material arranged such that a photo-luminescent response thereof is variable according to changes in a property of the photo-luminescent material inducible by changes in a property of the monitored environment;
   a detector arranged to receive photo-luminescent light generated by the photo-luminescent material in response to the illumination light and returned by the one or more retro-reflective optical elements in response to the illumination light, to determine a wavefront of said returned photo-luminescent light, and to detect a property of the monitored environment according to said returned photo-luminescent light;
   wherein the reflector unit is arranged to deform the deformable mirror according to a conjugate shape of said determined wavefront of said photo-luminescent light returned by the one or more retro-reflective optical elements, such that light from said light source is reflected by the deformable mirror so deformed to output illumination light with a modified wavefront.

2. The system according to claim 1 in which the illuminator is arranged to output said illumination light in a form of successive pulses of light and to change the deformation applied to the deformable mirror according to changes in the wavefront determined in respect of said light returned by the one or more retro-reflective optical elements in response to separate said pulses of the illumination light.

3. The system according to claim 1 in which the detector is arranged to determine successive said wavefronts at a rate of at least 10 times per second and the reflector unit is arranged to deform the deformable mirror at a corresponding rate according to the successive wavefronts determined by the detector.

4. The system according to claim 1 in which the deformable mirror comprises a reflecting area, a surface shape of which is deformable by a plurality of actuators coupled thereto, wherein a stroke of an actuator is greater than about 1 μm.

5. The system according to claim 1 in which the deformable mirror comprises a reflecting area, a surface shape of which is deformable by a plurality of actuators coupled thereto, wherein a product (S×F) of a value (S) of a stroke of an actuator and a value of a lowest resonance frequency (F) of the deformable mirror is a value of at least about $2 \times 10^{-2}$ HertzMetres.

6. The system according to claim 1 in which the deformable mirror comprises a substantially continuous reflecting area.

7. The system according to claim 1 including one or more said retro-reflective optical elements bearing an optical coating upon a surface thereof which is optically reflective to said illumination light.

8. The system according to claim 1 wherein said photo-luminescent material is exposed and directly accessible by said environment.

9. The system according to claim 1 in which the photo-luminescent material is responsive to a beam of light to generate photo-luminescent light comprising light of an optical wavelength differing from the optical wavelength(s) of light comprising the illumination light.

10. The system according to claim 1 in which the property of the monitored environment comprises at least one of temperature, pressure, and salinity.

11. The system according to claim 1, wherein:
   said photo-luminescent material comprises lucigenin;
   the property of the monitored environment is salinity; and
   said detector is arranged to detect a value of an intensity of said photo-luminescent response, to calculate a value representing a salinity of the monitored environment according to said intensity value, and to output a result.

12. The system according to claim 1 in which the photo-luminescent material comprises a Quantum Dot material, and the property of the monitored environment is temperature.

13. The system according to claim 12 in which said detector is arranged to detect a value of the optical wavelength at which a peak in said photo-luminescent response occurs, to calculate a value representing a temperature of the monitored environment according to said optical wavelength value, and to output a result.

14. The system according to claim 1 in which said photo-luminescent material comprises a platinum meso-tetra (pentafluorophenyl)porphine (PtTFPP), and the property of the monitored environment is pressure and/or temperature.

15. The system according to claim 14 in which said detector is arranged to detect a value of a intensity of said photo-luminescent response, to calculate a value representing a temperature and/or a pressure of the monitored environment according to said intensity value, and to output a result.

16. A method for remotely sensing light emanating from within a monitored environment, the method comprising:
generating light from a light source and reflecting light from a light source at a deformable mirror thereby to output illumination light for illuminating one or more retro-reflective optical elements within the monitored environment, the one or more retro-reflective optical elements bearing a photo-luminescent material arranged such that a photo-luminescent response thereof is variable according to changes in a property of the photo-luminescent material inducible by changes in a property of the monitored environment;
receiving photo-luminescent light generated by the photo-luminescent material in response to the illumination light and returned by the one or more retro-reflective optical elements in response to the illumination light;
determining a wavefront of said returned light;
determining phase conjugate shape of the wavefront of said returned light;
detecting a property of the monitored environment according to said returned light; and
deforming the deformable mirror according to said phase conjugate shape of the wavefront, such that light from said light source is reflected by the deformable mirror so deformed to output illumination light with a modified wavefront.

17. The method according to claim 16 including outputting said illumination light in a form of successive pulses of light and changing the deformation applied to the deformable mirror according to changes in the wavefront determined in respect of said light returned by the one or more retro-reflective optical elements in response to separate said pulses of the illumination light.

18. The method according to claim 16 including determining successive said wavefronts at a rate of at least 10 times per second and deforming the deformable mirror at a corresponding rate according to the successive wavefronts determined by the detector.

19. The method according to claim 16 in which the deformable mirror comprises a reflecting area, a surface shape of which is deformable by a plurality of actuators coupled thereto, wherein the method includes driving said actuators with a stroke greater than about 1 μm.

20. A system for remotely sensing light emanating from within a monitored environment, the system comprising:
an illuminator including a light source and a reflector unit, the reflector unit comprising a deformable mirror arranged to receive light from the light source and to reflect the received light thereby to output illumination light for illuminating one or more retro-reflective optical element(s) bearing photo-luminescent material arranged within the monitored environment; and
a detector arranged to receive photo-luminescent light generated by the photo-luminescent material in response to the illumination light and returned by the one or more retro-reflective optical elements in response to the illumination light, the detector comprising a plane mirror to partially transmit said returned light to a first component and to partially reflect said returned light to a second component, the first component to determine a wavefront of said returned light, and the second component to detect a property of the monitored environment according to said returned light.

21. The system of claim 20, wherein:
the detector is arranged to determine a phase conjugate shape of the wavefront of said returned light, and generate a control signal based on the phase conjugate shape of the wavefront; and
the reflector unit is arranged to deform the deformable mirror according to the control signal, such that light from said light source is reflected by the deformable mirror so deformed to output illumination light with a modified wavefront.

22. The system of claim 20, wherein the property of the monitored environment comprises at least one of temperature, pressure, and salinity.

* * * * *